United States Patent
Allen et al.

(10) Patent No.: US 8,156,989 B2
(45) Date of Patent: Apr. 17, 2012

(54) COMPACT HANDHELD ADHESIVE APPLICATOR

(75) Inventors: Scott M. Allen, Braselton, GA (US); David J. Trettin, Chamblee, GA (US)

(73) Assignee: RS Industrial, Inc., Buford, GA (US)

( * ) Notice: Subject to any disclaimer, the term of this patent is extended or adjusted under 35 U.S.C. 154(b) by 169 days.

(21) Appl. No.: 12/121,359

(22) Filed: May 15, 2008

(65) Prior Publication Data

US 2008/0283181 A1    Nov. 20, 2008

Related U.S. Application Data

(60) Provisional application No. 60/917,987, filed on May 15, 2007, provisional application No. 60/917,986, filed on May 15, 2007, provisional application No. 60/987,506, filed on Nov. 13, 2007, provisional application No. 60/987,491, filed on Nov. 13, 2007.

(51) Int. Cl.
*B32B 1/00* (2006.01)

(52) U.S. Cl. ........ 156/577; 156/523; 156/527; 156/538; 156/574; 156/579; 118/76; 118/200; 118/257; 225/46; 206/411; 242/160.2; 242/160.4; 242/170; 242/171; 242/588; 242/588.2; 242/588.3; 242/588.6

(58) Field of Classification Search .......... 156/523, 156/527, 538, 574, 577, 579; 118/76, 200, 118/257; 225/46; 206/411; 242/160.2, 160.4, 242/170, 171, 588, 588.2, 588.3, 588.6
See application file for complete search history.

(56) References Cited

U.S. PATENT DOCUMENTS

| | | |
|---|---|---|
| RE29,335 E | 8/1977 | Gates et al. |
| 4,046,613 A | 9/1977 | Kucheck et al. |
| 4,239,570 A | 12/1980 | Kerwin |
| 4,560,087 A | 12/1985 | Sato et al. |
| 5,316,613 A | 5/1994 | Samuelson et al. |
| 5,380,395 A | 1/1995 | Uchida |
| 6,125,903 A | 10/2000 | Uchida |
| 6,280,565 B1 | 8/2001 | Underwood |
| 6,435,248 B1 | 8/2002 | Masumoto |
| 6,516,854 B1 | 2/2003 | Tsai |
| 6,686,016 B2 | 2/2004 | Downs |
| 6,730,186 B2 | 5/2004 | Takahashi |
| 6,745,808 B2 * | 6/2004 | Kobayashi ............ 156/577 |

(Continued)

FOREIGN PATENT DOCUMENTS

EP    1 445 226 A2    8/2004

(Continued)

OTHER PUBLICATIONS

English translation of JP 08-090994 A (1996).*

*Primary Examiner* — Mark A Osele
*Assistant Examiner* — Nickolas Harm
(74) *Attorney, Agent, or Firm* — Cook Alex Ltd.

(57) ABSTRACT

A compact handheld adhesive applicator is provided with a housing assembly and a cartridge assembly removably connected to the housing assembly. The cartridge assembly includes a primary spool for mounting an adhesive segment roll and a secondary spool for automatically winding a spent portion of the adhesive segment roll. A gear arrangement allows for numerous adhesive segments to be applied consecutively in a glide-type application or for a single adhesive segment to be accurately applied using a manual advance feature.

19 Claims, 26 Drawing Sheets

U.S. PATENT DOCUMENTS

| | | |
|---|---|---|
| 7,059,374 B2 | 6/2006 | Mitsui et al. |
| 7,195,049 B2 | 3/2007 | Downs et al. |
| 7,204,287 B2 | 4/2007 | Casaldi et al. |
| 7,235,151 B2 | 6/2007 | Velasquez et al. |
| 2002/0102402 A1 | 8/2002 | Neuburger et al. |
| 2002/0124970 A1 | 9/2002 | Ensign, Jr. et al. |
| 2003/0164220 A1 | 9/2003 | Downs et al. |
| 2003/0209331 A1 | 11/2003 | Worth |
| 2003/0234082 A1 | 12/2003 | Casaldi et al. |
| 2004/0050501 A1 | 3/2004 | Lemens et al. |
| 2004/0062924 A1 | 4/2004 | Neuburger |
| 2004/0149392 A1 | 8/2004 | Casaldi et al. |
| 2004/0149798 A1 | 8/2004 | Hoffman et al. |
| 2005/0098267 A1 | 5/2005 | Hoffman et al. |
| 2005/0126692 A1 | 6/2005 | Hajny et al. |
| 2005/0178507 A1 | 8/2005 | Hajny et al. |
| 2006/0263563 A1 | 11/2006 | Neuburger |
| 2007/0175589 A1 | 8/2007 | Casalidi et al. |

FOREIGN PATENT DOCUMENTS

| | | |
|---|---|---|
| JP | 1991128299 A * | 5/1991 |
| WO | WO 2005/056389 A1 | 6/2005 |
| WO | WO 2005/056706 A2 | 6/2005 |

* cited by examiner

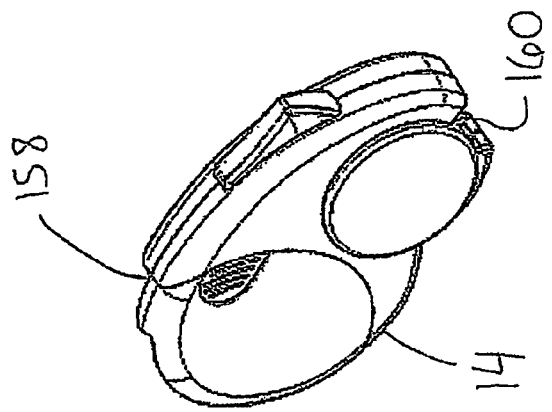
Fig. 2
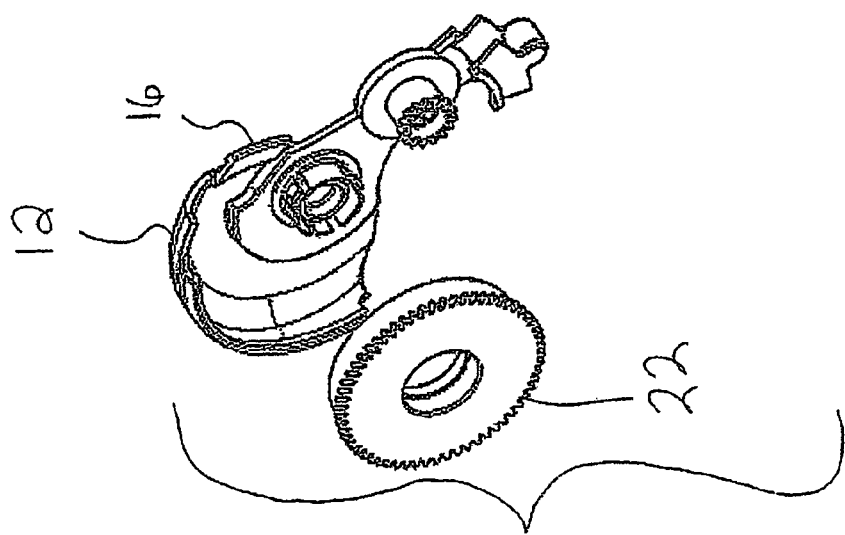
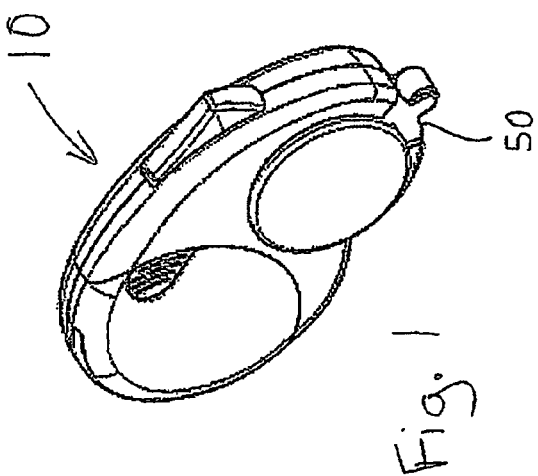
Fig. 1

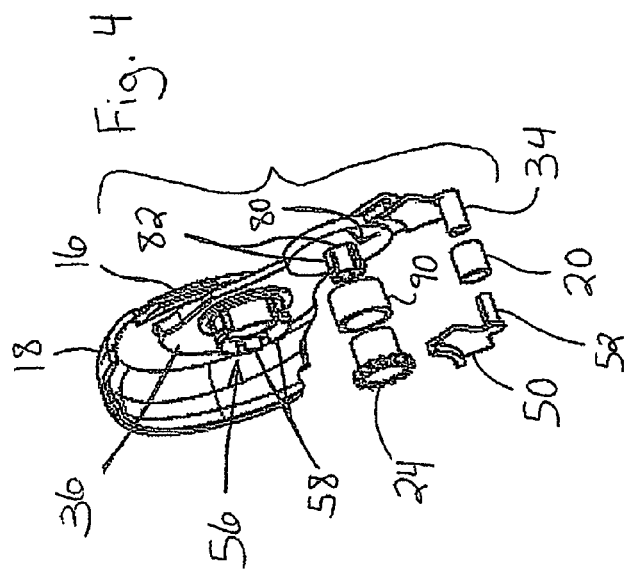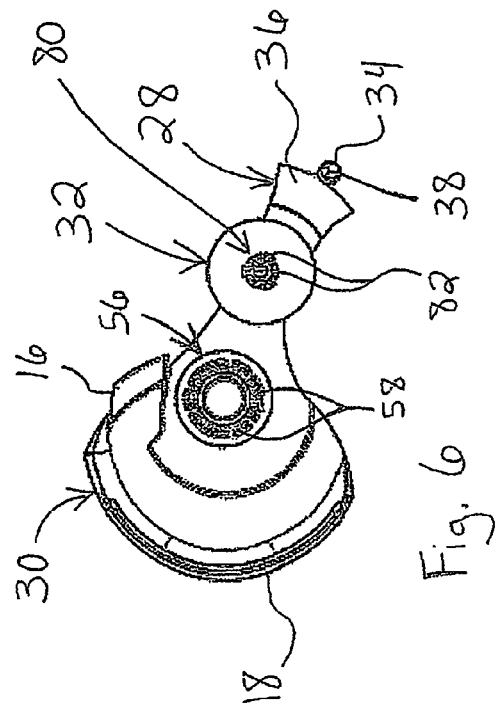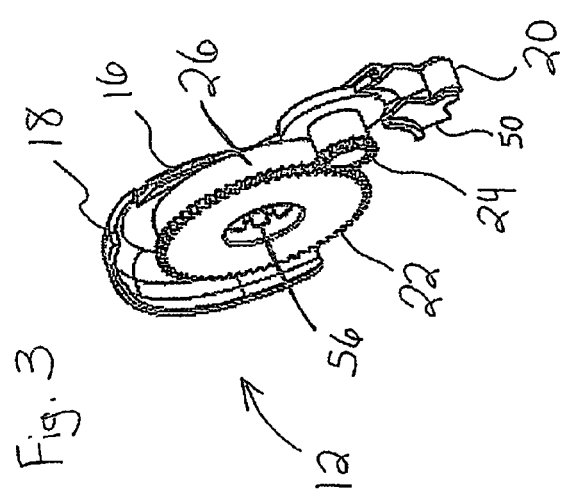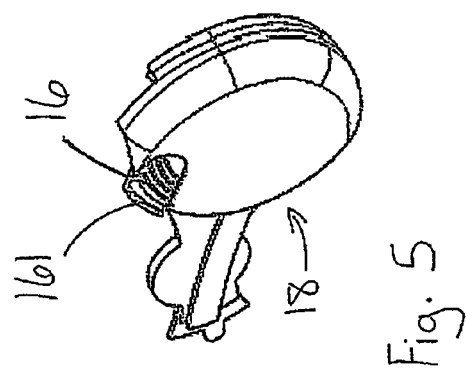

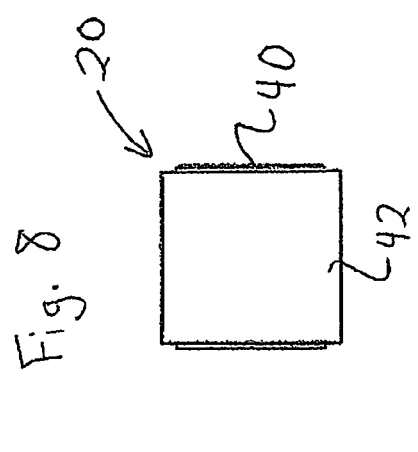
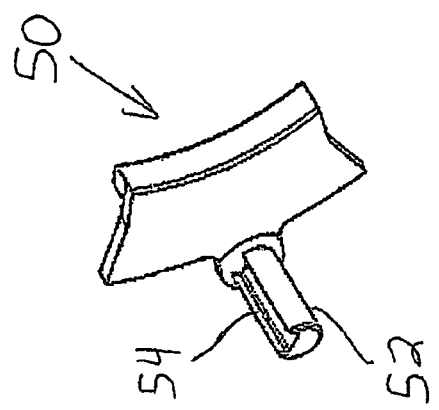
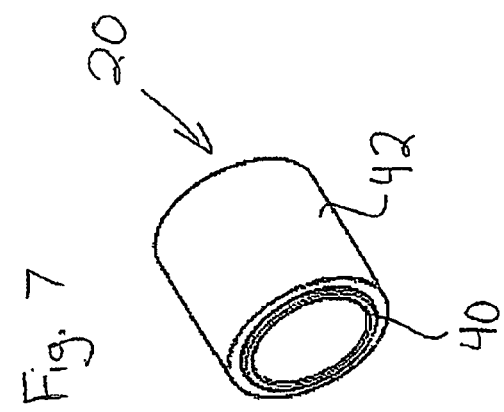
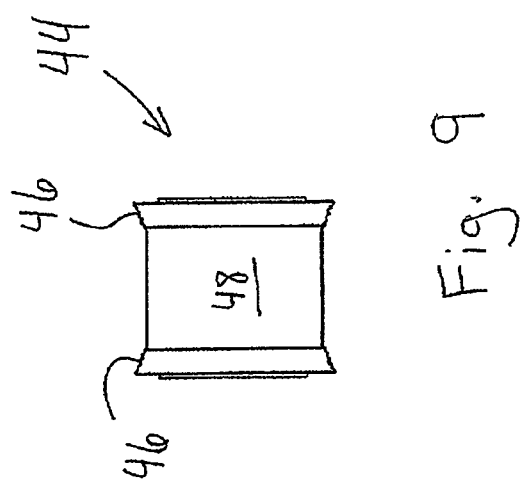

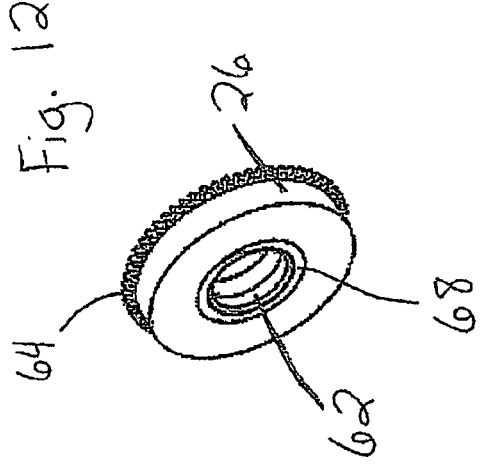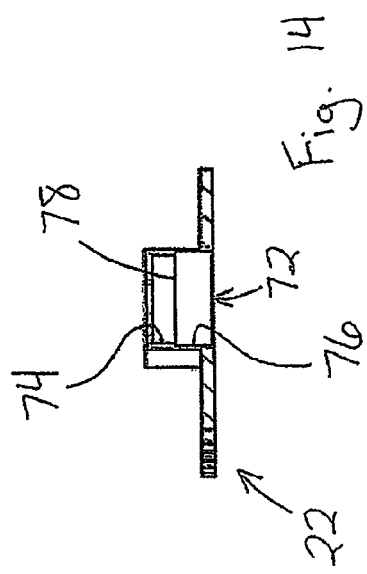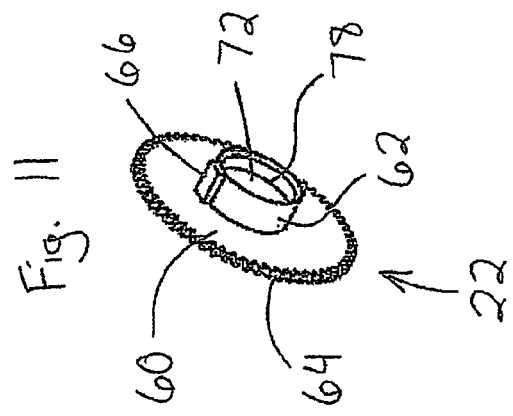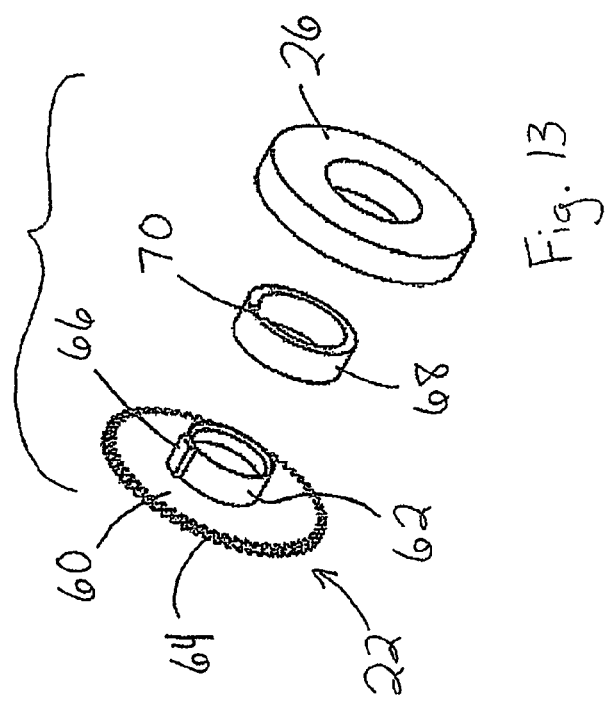

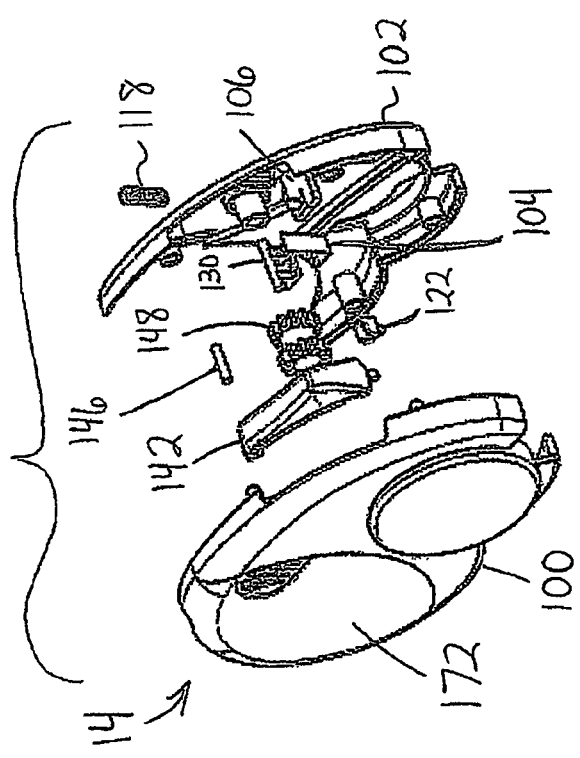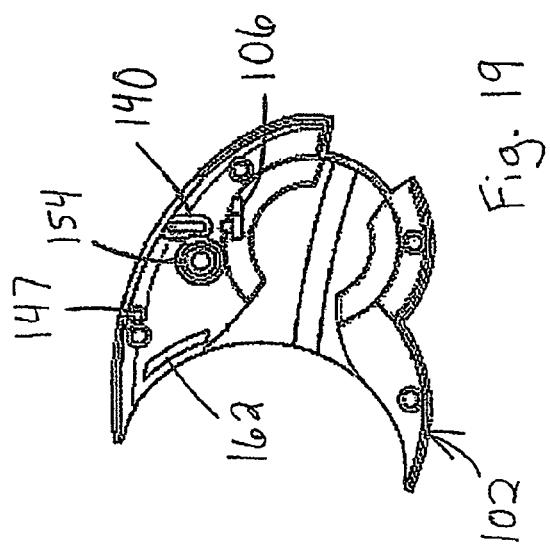

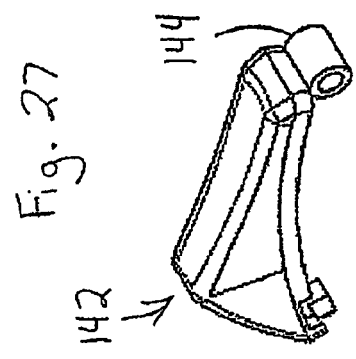
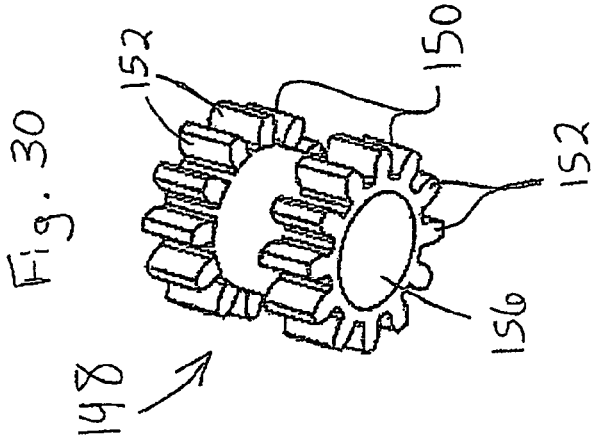
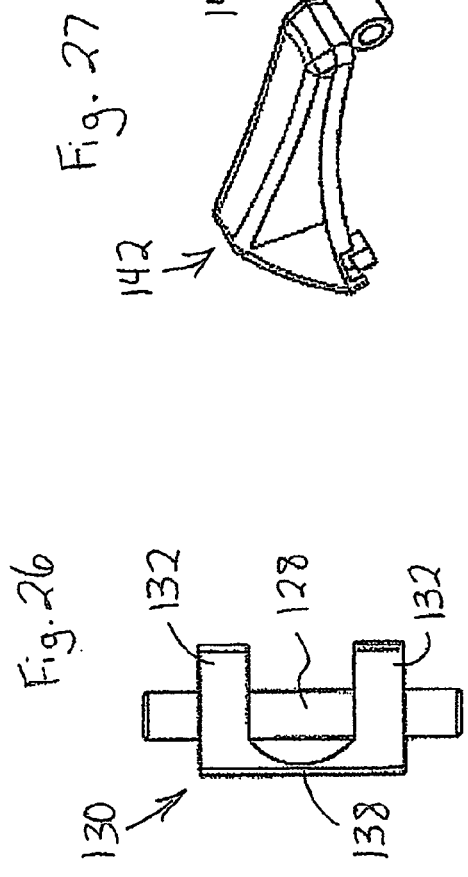
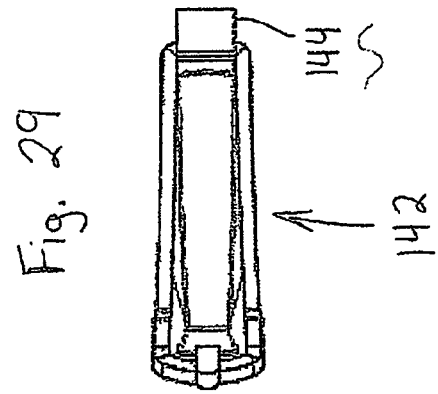
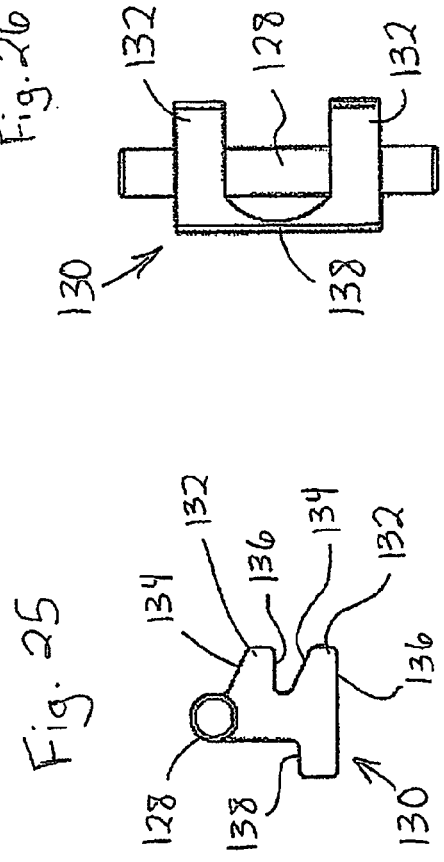
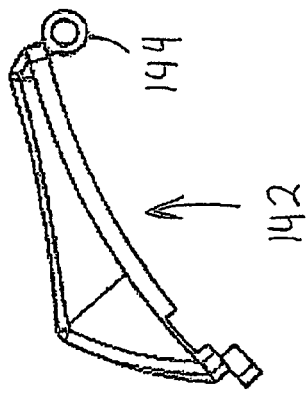

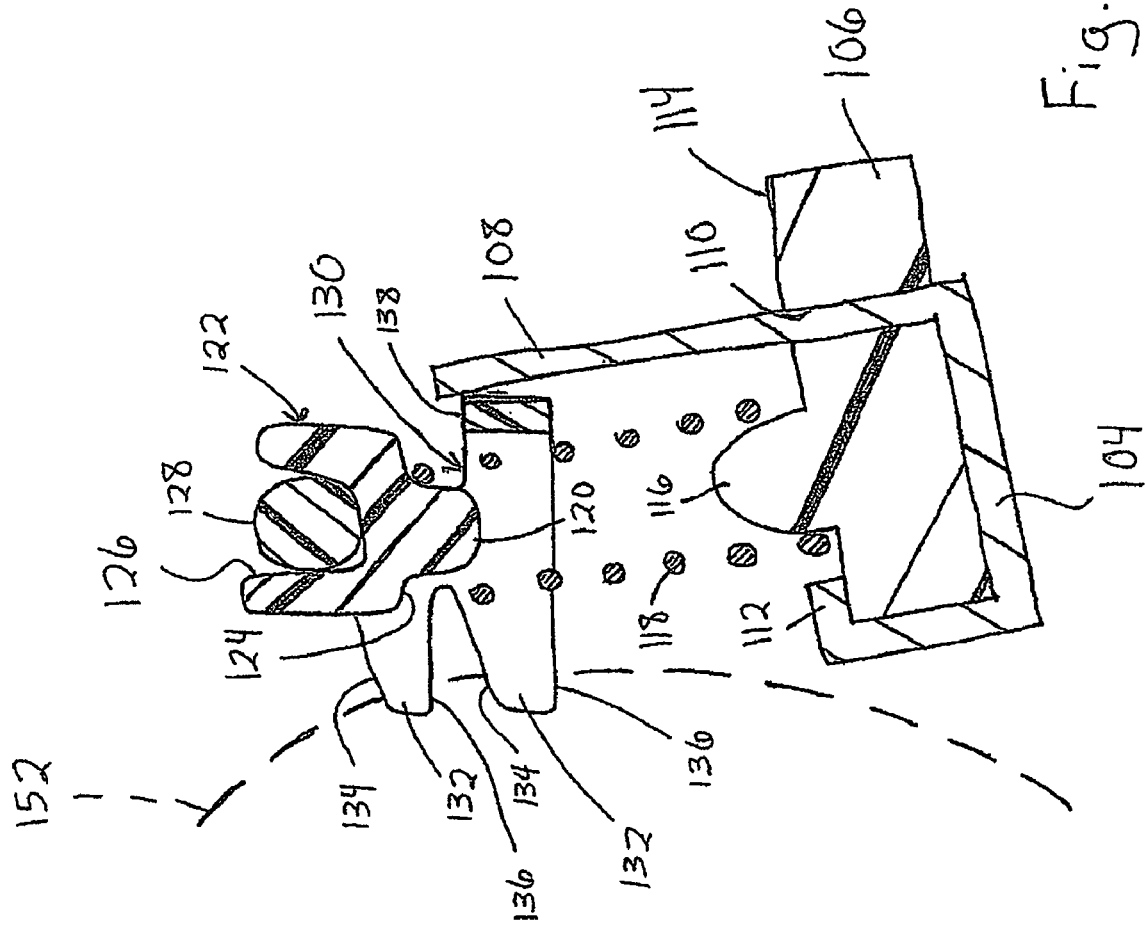

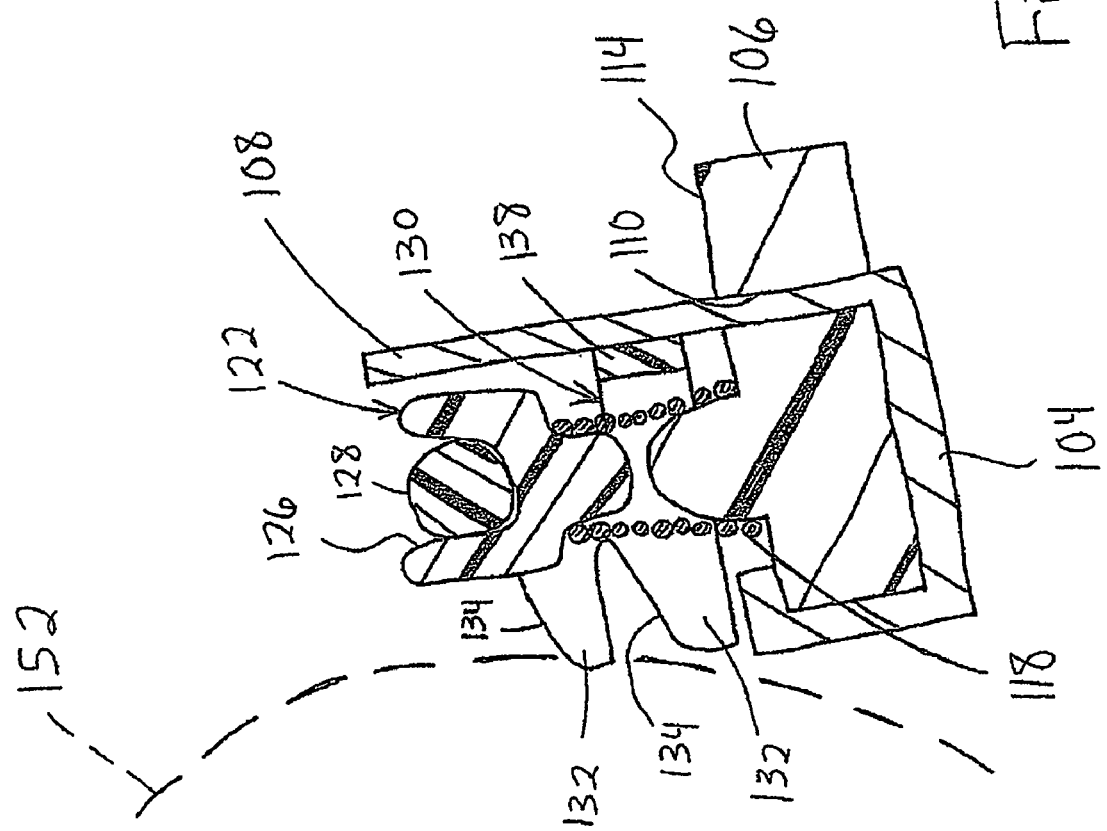

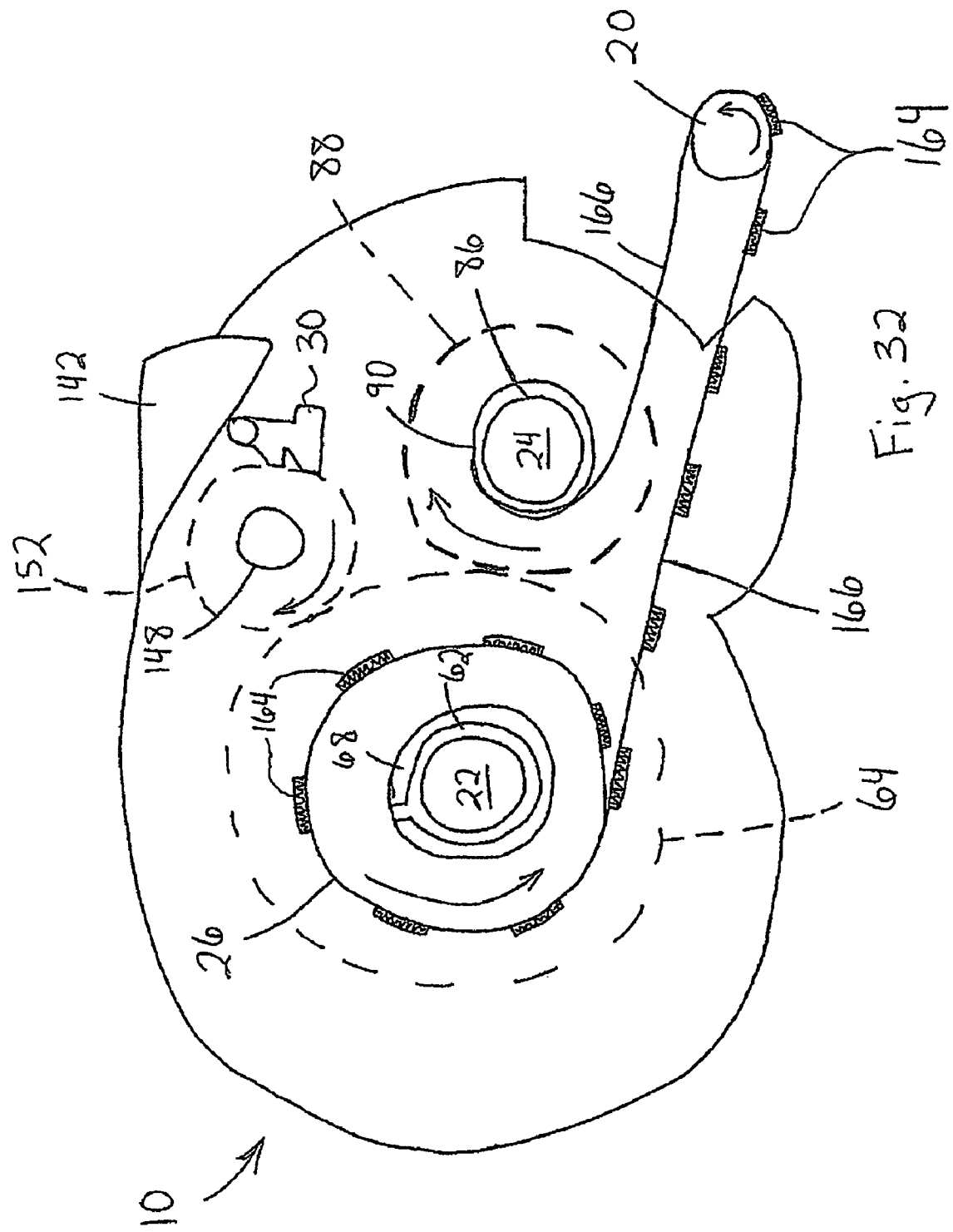

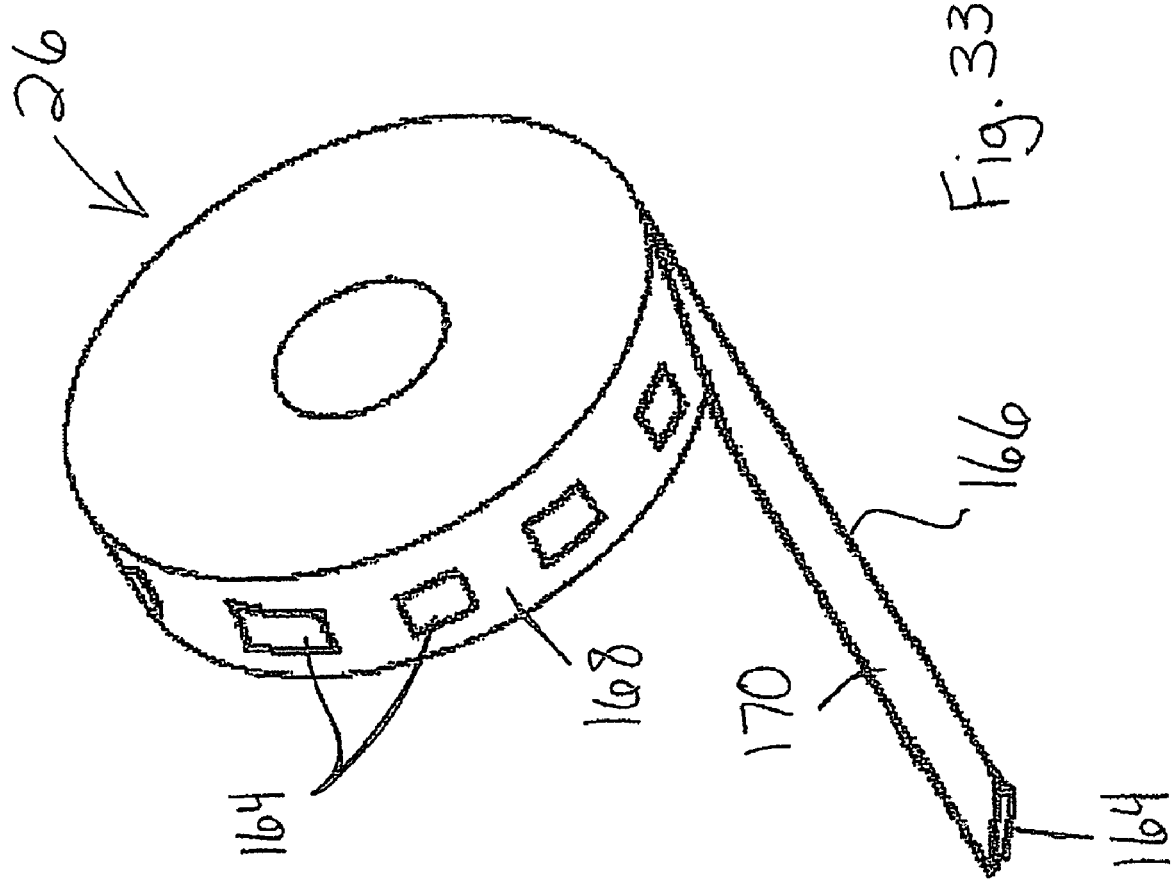

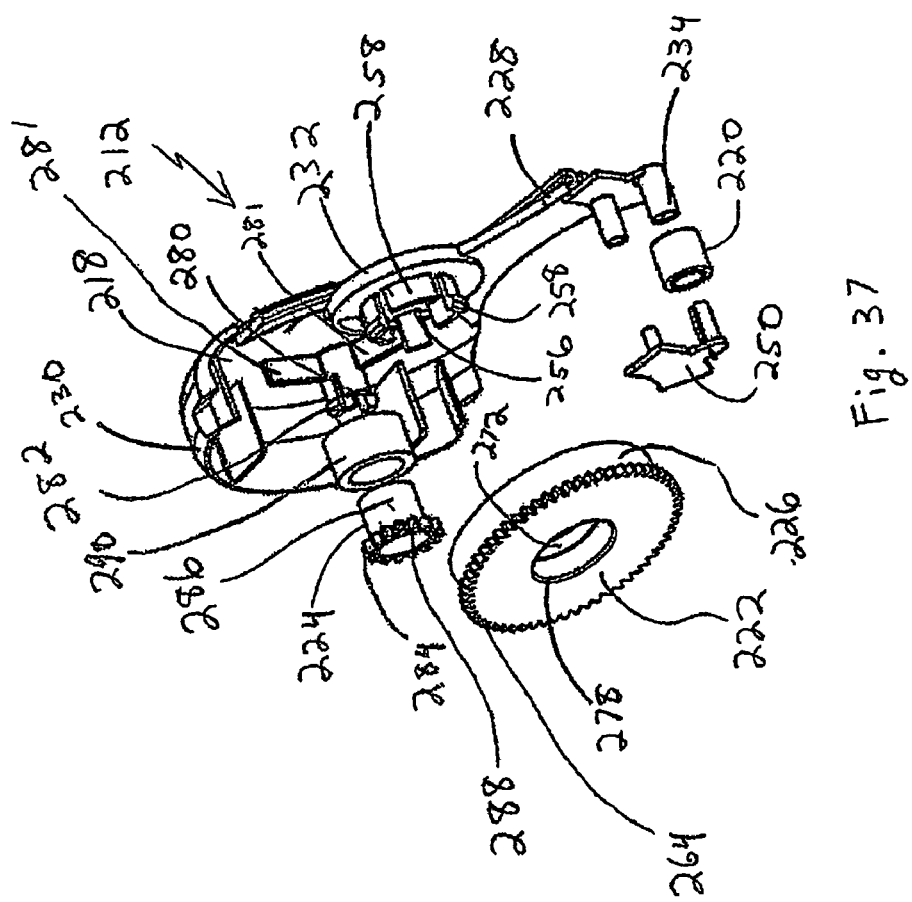

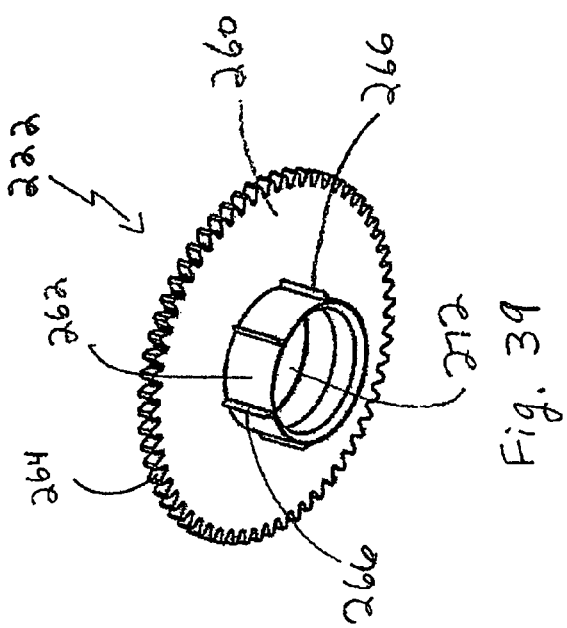
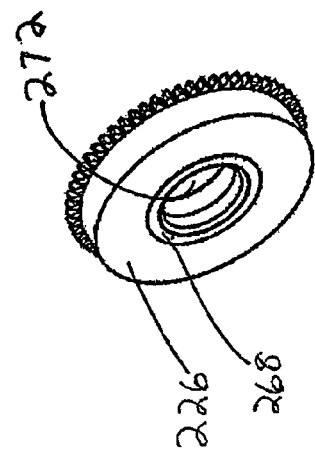
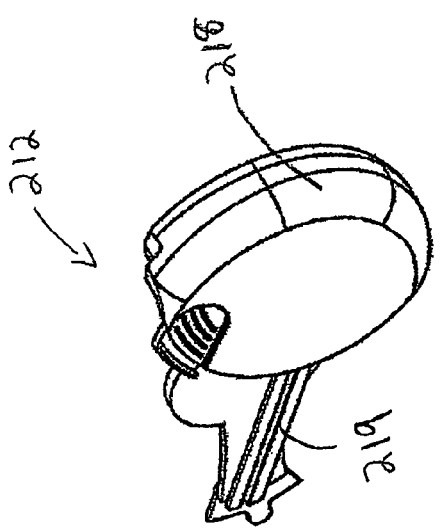
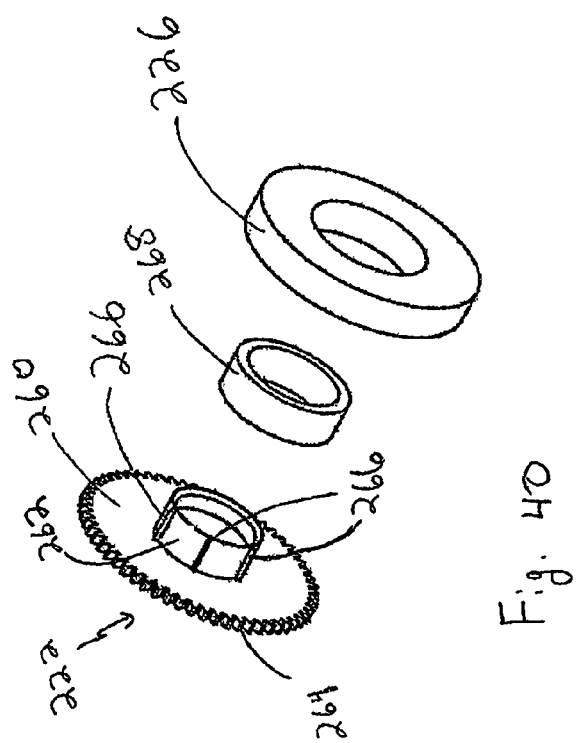

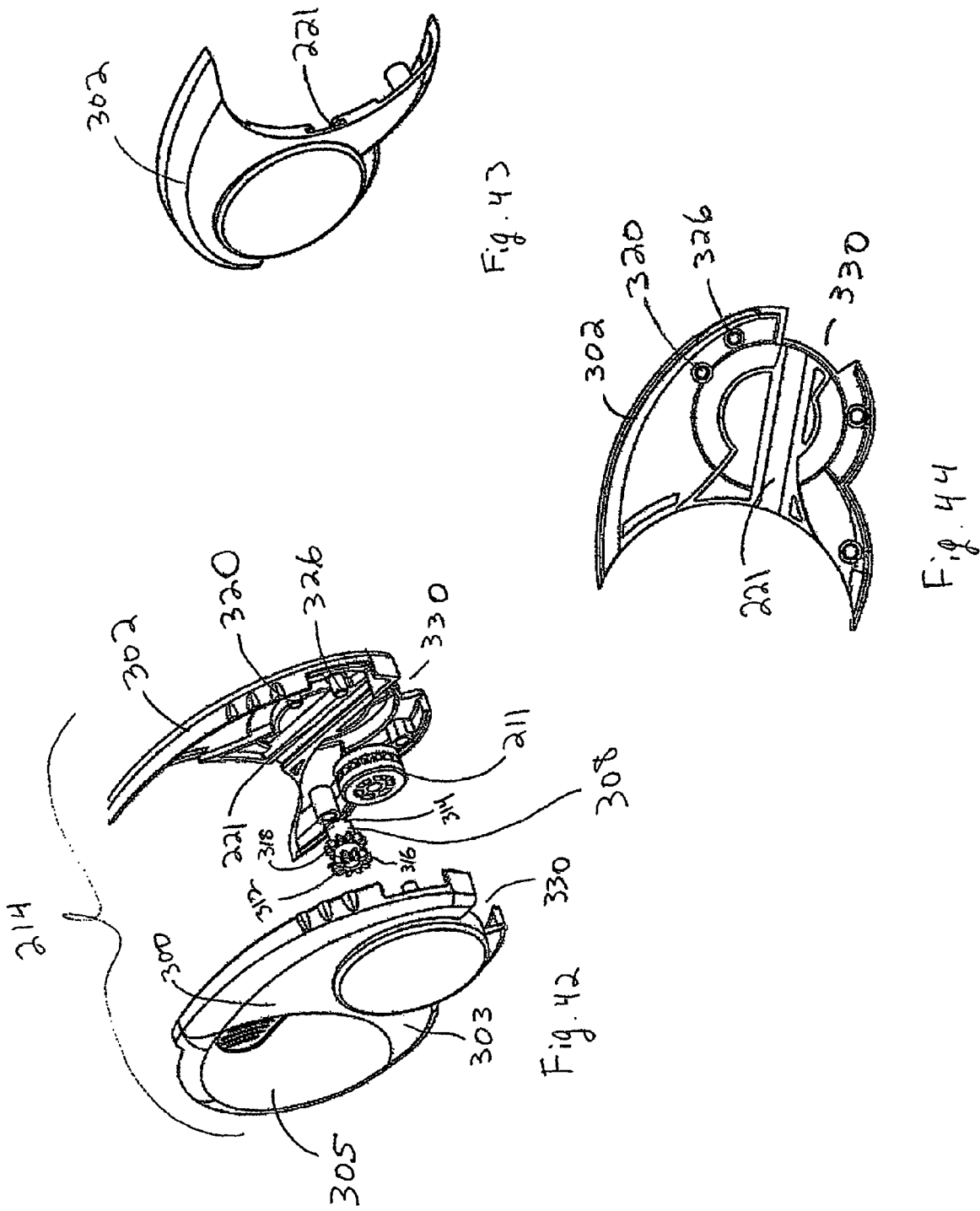

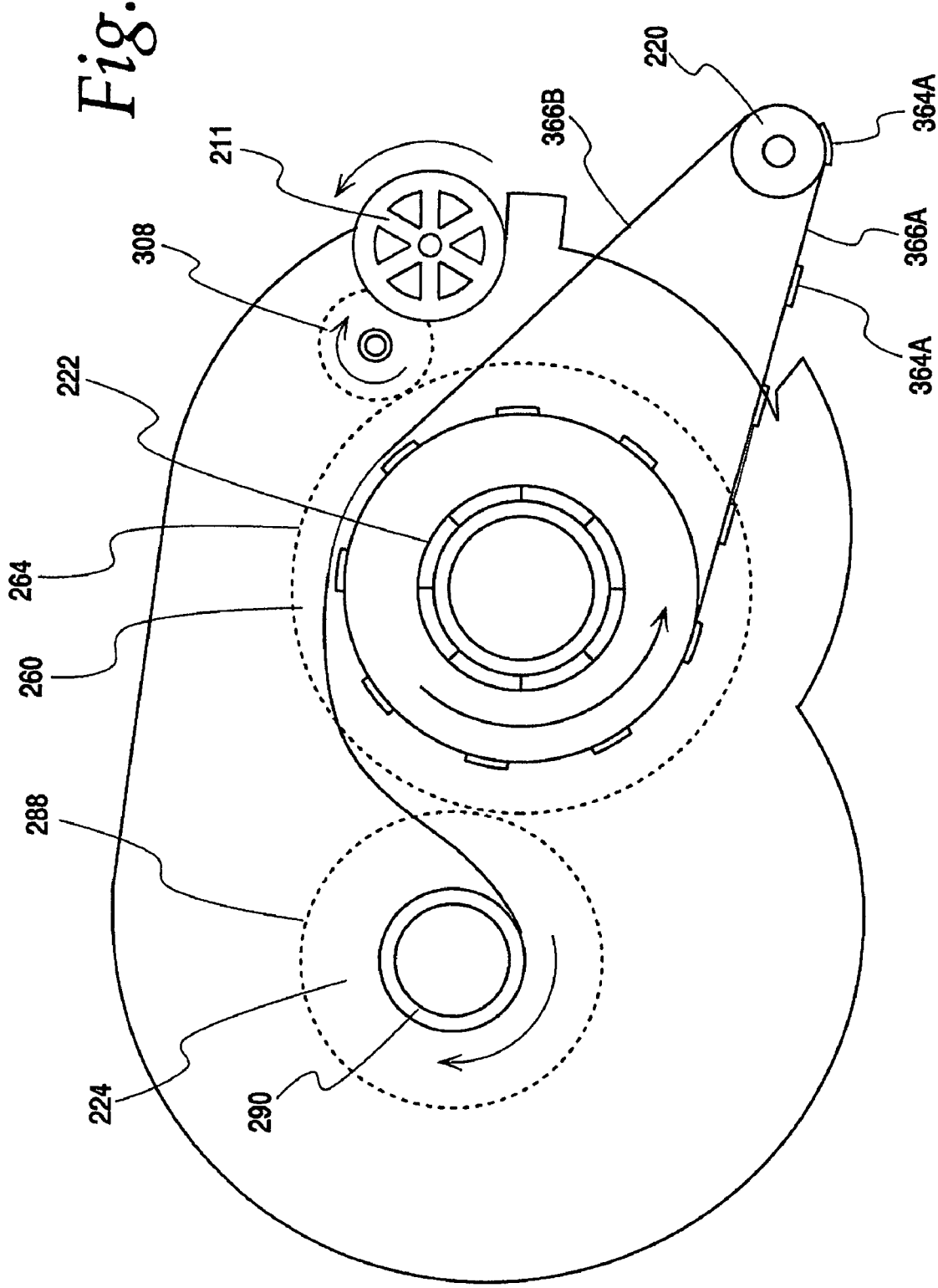

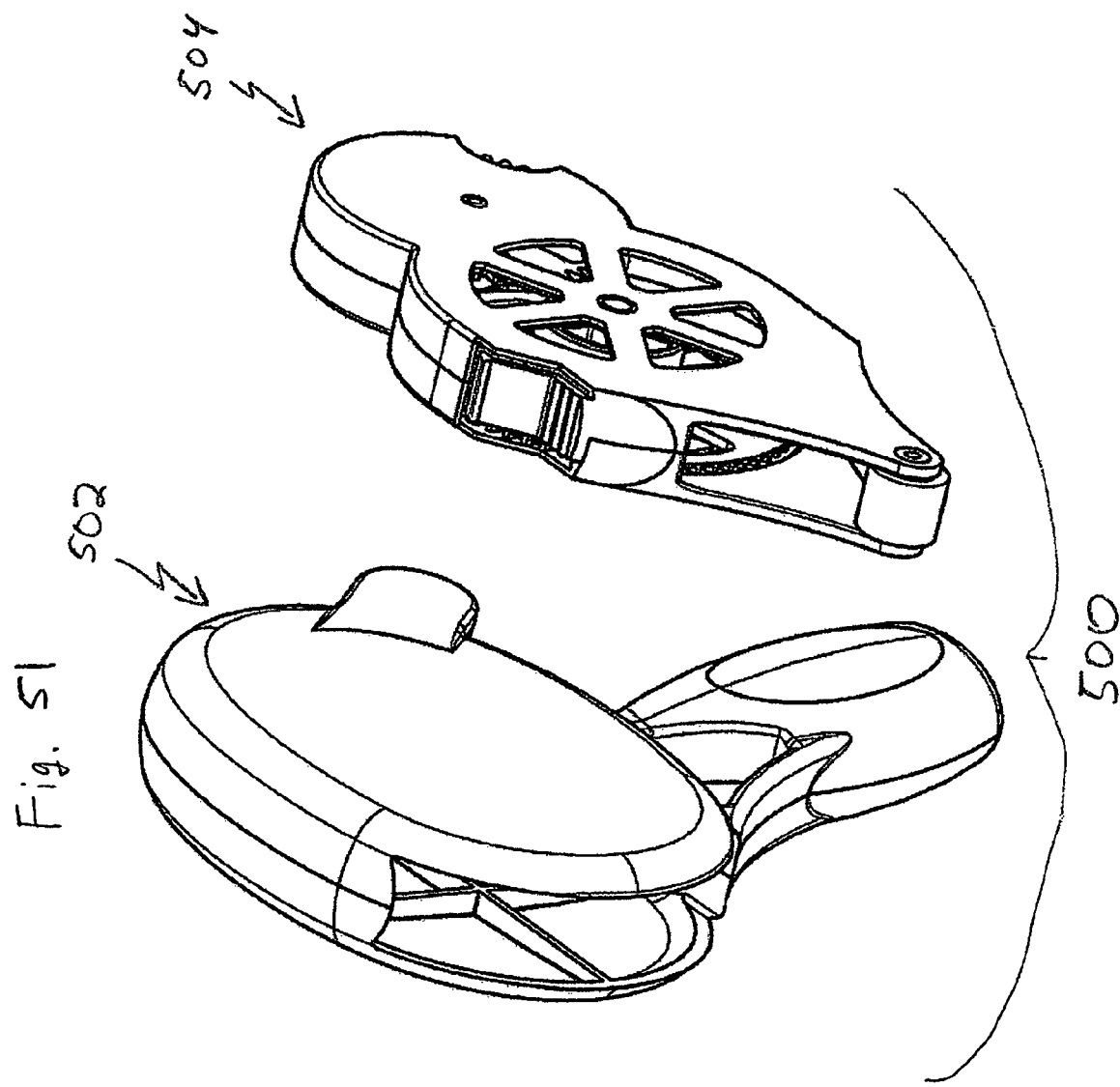

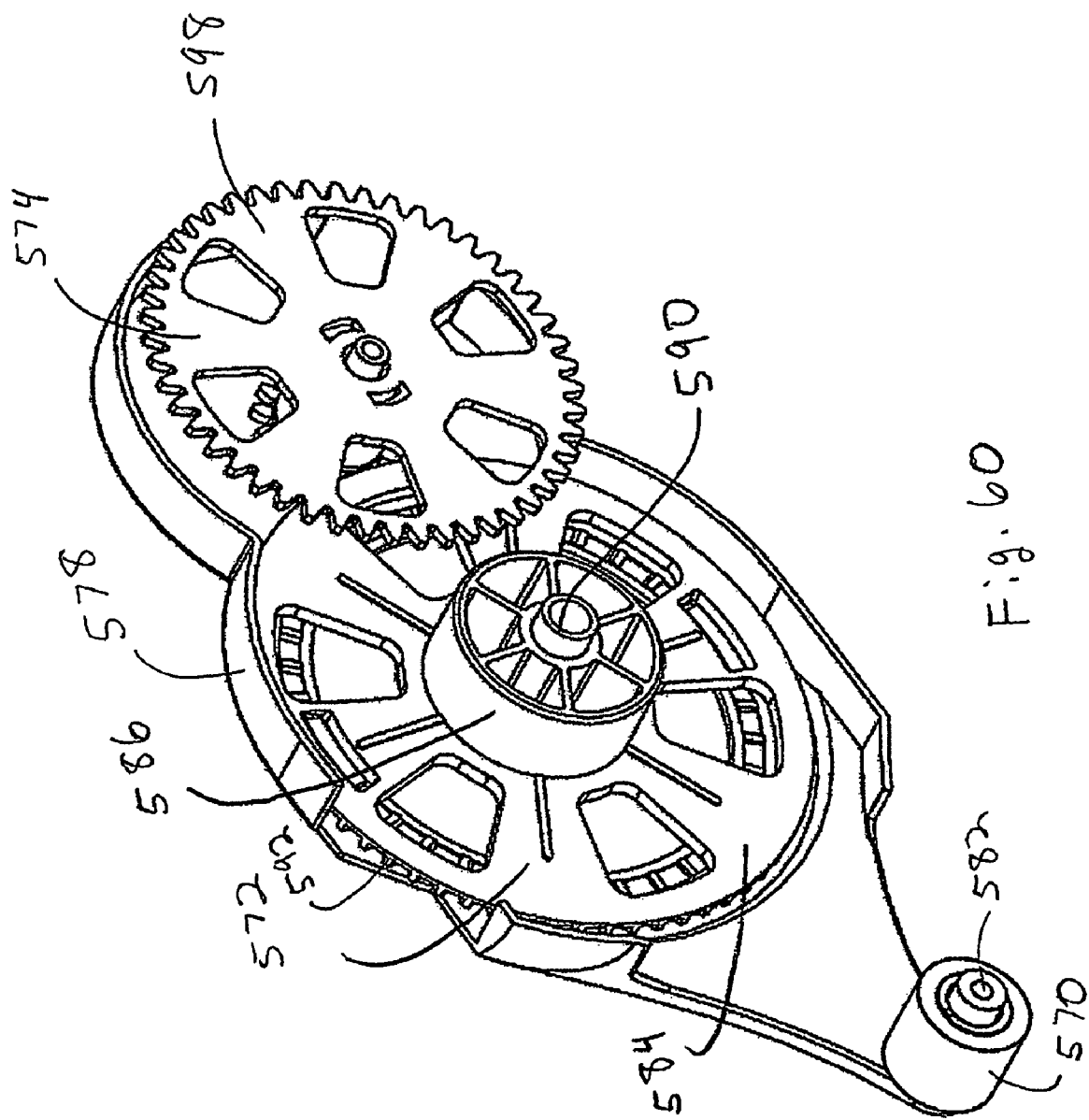

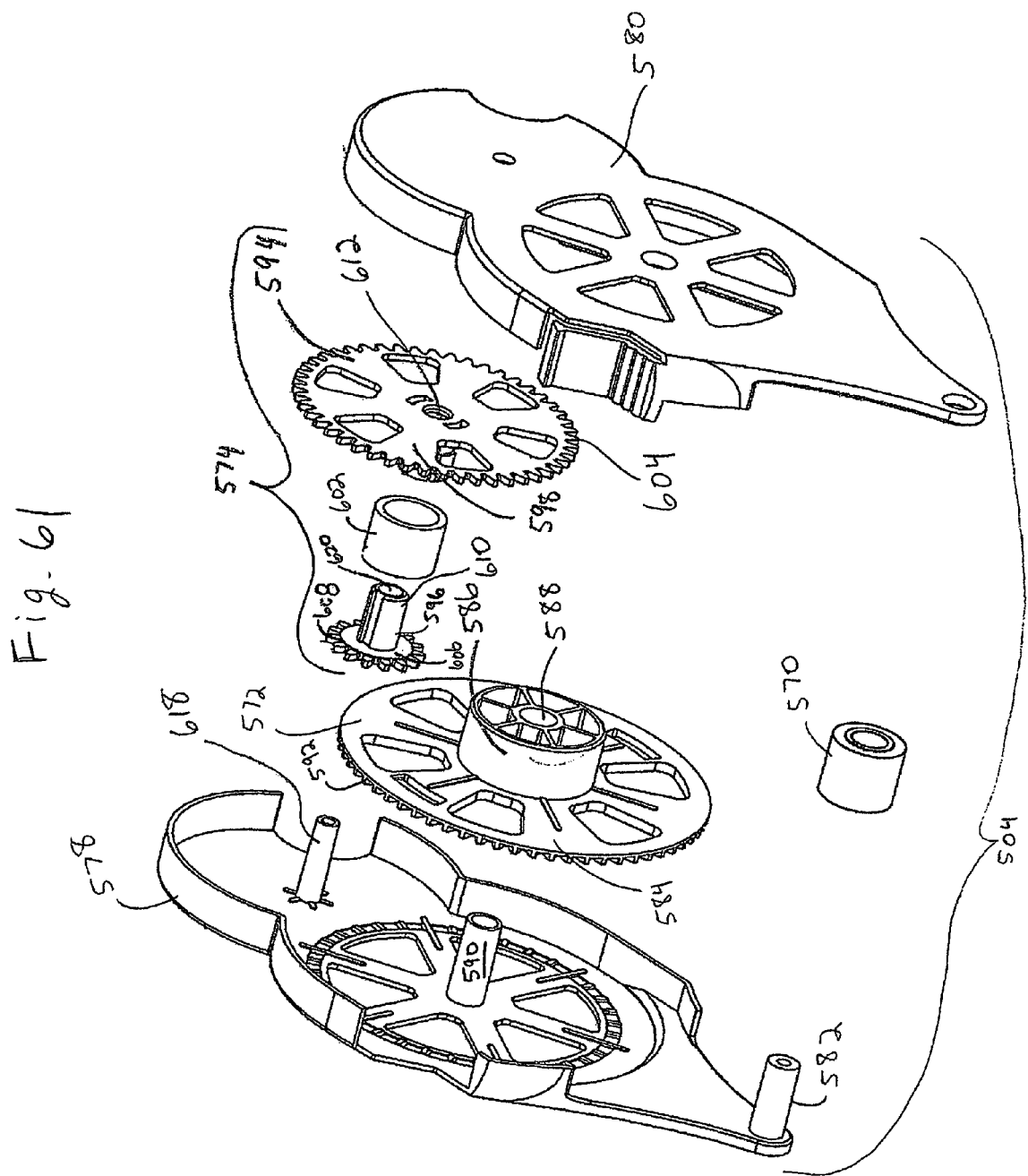

ns dispensed from a release liner to attach
COMPACT HANDHELD ADHESIVE APPLICATOR The present application claims the benefit of U.S. Provisional Application Nos. 60/917,987 and 60/917,986, both filed May 15, 2007 and U.S. Provisional Application Nos. 60/987,506 and 60/987,491, both filed Nov. 13, 2007, all of which are incorporated by reference.

FIELD OF THE INVENTION

This invention generally relates to the application of pressure-sensitive adhesive segments from a release liner. More particularly, this invention relates to handheld devices for applying pressure-sensitive adhesive segments from a release liner.

DESCRIPTION OF RELATED ART

Hobbyists and home craft artists, particularly those involved in scrapbooking, commonly use pressure-sensitive adhesive segments dispensed from a release liner to attach displayed objects, such as photographs, newspaper articles and other such memorabilia, to a substrate such as scrapbook pages or other display medium. The pressure-sensitive adhesive segments are typically arranged seriatim on the release liner in a manner that allows the segments to be dispensed either singly, i.e., one at a time, or multiply, i.e., in groups including a plurality of segments. Typically, adhesive segments are dispensed from a roll of release liner onto a recipient surface (of either the displayed object or the substrate to which it is attached) by bringing one or several of the adhesive segments into contact with the surface of the recipient. The adhesive segments intentionally have greater adherence to the recipient surface than to the release liner. As a result, subsequent relative movement between the release liner and the recipient causes the adhesive segment or segments to release from the release liner and remain adhered to the recipient. With the adhesive segment or segments adhered to the recipient, the displayed object may then be attached to the substrate.

One possible alternative to dispensing the adhesive segments directly from the release liner to the surface of a recipient is to remove an adhesive segment from the release liner by hand and then apply it to the object. However, there are numerous practical problems with such a method. For example, pressure-sensitive adhesive segments by their nature are, of course, sticky and gummy. When handled by hand, the adhesive tends to stick to the fingers and ball-up. Because of the stickiness of the adhesive segment, it is often difficult to transfer the adhesive segment from the hand to an object. Additionally, because the adhesive segment oftentimes balls-up when handle by hand, the adhesive segment is not applied to the recipient in its original shape nor in an even layer. Not applying the adhesive segment in its original shape nor in an even layer affects the adhesive segment's strength of adhesion. Furthermore, the human hand has oils that negatively affect the adhesion and can also bring acid to the surface, adversely affecting long term archivability.

Applying adhesive segments according to the foregoing method may be adequate in limited circumstances when securing a relatively small object, but application by hand is not preferred for larger objects or projects requiring the repeated application of one or more adhesive segments to different recipients. Furthermore, adhesive segments are widely used in commercial applications to secure objects, e.g., applications such as removably securing a credit card to a transmittal letter, applying a product label, or sealing packaging. To that end, numerous handheld adhesive applicators have been provided, which allow for more controlled, rapid application of a larger number of adhesive segments to an object. Examples of known handheld adhesive applicators include those described in U.S. Pat. No. 7,195,049 and in U.S. Patent Application Publication No. US 2005/0178507, both of which are hereby incorporated by reference herein.

There are a number of disadvantages associated with known handheld adhesive applicators, most notably their general lack of operational flexibility. For example, some known devices are well-suited for a single type of application, such as in what will be referred to herein as glide-type applications. These are applications requiring several adhesive segments to be applied quickly in a straight line with an uninterrupted movement of the device. But these devices are poorly suited for other types of applications, such as those requiring the repeated application of a single adhesive segment. Other known handheld devices are provided with a pistol-grip handle that is suitable for some applications, but obtrusive for other applications. Additional disadvantages include the need to manually thread and secure a new roll after a first adhesive segment roll has been exhausted.

Therefore, a need remains for a handheld device that provides enhanced operational flexibility. Other needs include a handheld device with an improved roll reloading mechanism.

SUMMARY OF THE INVENTION

In accordance with one embodiment or aspect of the present invention, a handheld adhesive applicator is provided with a housing assembly and a cartridge assembly removably connected to the housing assembly. The cartridge assembly includes a primary spool for mounting an adhesive segment roll and a secondary spool for automatically winding a spent portion of the adhesive segment roll. A gear arrangement allows for numerous adhesive segments to be applied consecutively in a glide-type application or for a single adhesive segment to be accurately applied using a manual advance feature.

One aspect of the present invention relates to an adhesive applicator that includes a housing having a primary spool and a secondary spool mounted to the housing. The primary spool receives an adhesive roll that includes a wound supply of liner, such as a release liner, which carries an adhesive. The secondary spool is mounted to the housing and collects portions of the liner advanced from the adhesive roll. The applicator also includes a track wheel rotatably mounted to the housing. The track wheel can be rotated by the finger of a user to advance a desired amount of the liner from the adhesive roll.

Yet another aspect relates to an adhesive applicator including a housing and a cartridge removably connected to the housing. The cartridge has a primary spool and a secondary or take-up spool. The primary spool receives an adhesive roll that includes a wound supply of a liner which has adhesive deposited thereon. The secondary spool collects portions of the liner advanced from the adhesive roll. The applicator also includes a track wheel that advances a desired amount of liner from the adhesive roll.

A further aspect relates to an adhesive applicator including a rotatable adhesive roll having a wound supply of liner. The liner including an adhesive deposited thereon. The applicator also includes a take-up roll that has a portion of the liner connected thereto. The take-up roll collects the liner as it is advanced from the adhesive roll. The applicator further includes a finger rotatable advancement member that advances a desired amount of the liner from the adhesive roll.

Yet another aspect relates to a method of applying adhesive. The method includes providing an adhesive applicator having an adhesive roll. The adhesive roll includes a wound supply of a liner carrying an adhesive. A finger rotatable advancement member of the applicator is then rotate to advance a desired amount of the liner from the adhesive roll. A portion or portion of the liner advanced from the adhesive roll is collected by a take-up roll. Adhesive is then applied from the liner to an object.

BRIEF DESCRIPTION OF THE DRAWINGS

FIG. 1 is a front perspective view of a compact handheld adhesive applicator according to an aspect of the present invention.

FIG. 2 is an exploded view of the compact handheld adhesive applicator of FIG. 1.

FIG. 3 is a front perspective view of a cartridge assembly of the compact handheld adhesive applicator of FIG. 1.

FIG. 4 is an exploded view of the cartridge assembly of FIG. 3.

FIG. 5 is a rear perspective view of a cartridge body of the cartridge assembly of FIG. 3.

FIG. 6 is a side elevation view of the cartridge body of FIG. 5.

FIG. 7 is a perspective view of a roller suitable for use with the cartridge assembly of FIG. 3.

FIG. 8 is a side elevation view of the roller of FIG. 7.

FIG. 9 is a side elevation view of another embodiment of a roller suitable for use with the cartridge assembly of FIG. 3.

FIG. 10 is a perspective view of a faceplate of the cartridge assembly of FIG. 3.

FIG. 11 is a perspective view of a primary spool of the cartridge assembly of FIG. 3.

FIG. 12 is a perspective view of a roll of adhesive segments mounted on the primary spool of FIG. 11.

FIG. 13 is an exploded view of the primary spool and roll of adhesive segments of FIG. 11.

FIG. 14 is a cross-sectional view of the primary spool of FIG. 11.

FIG. 17 is an exploded view of a housing assembly of the compact handheld adhesive applicator of FIG. 1.

FIG. 18 is a rear perspective view of a right housing body half of the housing assembly of FIG. 17.

FIG. 19 is a side elevation view of the right housing body half of the housing assembly of FIG. 17, showing the interior thereof.

FIG. 25 is a side elevation view of the ratchet of FIG. 24.

FIG. 26 is a bottom plan view of the ratchet of FIG. 24.

FIG. 27 is a perspective view of a trigger of the housing assembly of FIG. 17.

FIG. 28 is a side elevation view of the trigger of FIG. 27.

FIG. 29 is a bottom plan view of the trigger of FIG. 27.

FIG. 30 is a perspective view of an advance gear of the housing assembly of FIG. 17.

FIG. 31A is a cross-sectional view of selected components of the housing assembly of FIG. 17 in an uncompressed condition.

FIG. 31B shows the components of FIG. 31A in a compressed condition.

FIG. 32 is a side elevation view of the compact handheld adhesive applicator of FIG. 1, with selected components removed for clarity.

FIG. 33 is a perspective view of a roll of adhesive segments suitable for use with a compact handheld adhesive applicator according to the present invention.

FIG. 36 is a front perspective view of a cartridge assembly of the compact handheld applicator of FIG. 34.

FIG. 37 is an exploded view of the cartridge assembly of FIG. 36.

FIG. 38 is a rear perspective view of the cartridge assembly of FIG. 36.

FIG. 39 is a perspective view of an embodiment of a primary spool that is suitable for use with the cartridge assemblies of FIGS. 3 and 36.

FIG. 40 is an exploded view showing the primary spool of FIG. 39 and a roll of adhesive segments that can be mounted on the primary spool.

FIG. 41 is a perspective view of a roll of adhesive segments mounted on the primary spool of FIG. 39.

FIG. 42 is an exploded view of the housing assembly of the compact handheld applicator of FIG. 34.

FIG. 43 is a rear perspective view of the right body half of the housing assembly of FIG. 42.

FIG. 44 is a side elevation view of the right body half of the housing assembly of FIG. 42, showing the interior thereof.

FIG. 50 is a side elevation view of the compact handheld applicator of FIG. 34, shown with selected components removed for clarity.

FIG. 51 is a perspective view of one embodiment of a housing assembly and a cartridge assembly of another embodiment of a handheld applicator in accordance with the present disclosure.

FIG. 60 is a perspective view of the cartridge assembly of FIG. 52 with half of the cartridge body removed to show the internal components.

FIG. 61 is an exploded view of the cartridge assembly of FIG. 52.

DESCRIPTION OF ILLUSTRATED EMBODIMENTS

Figure 16:
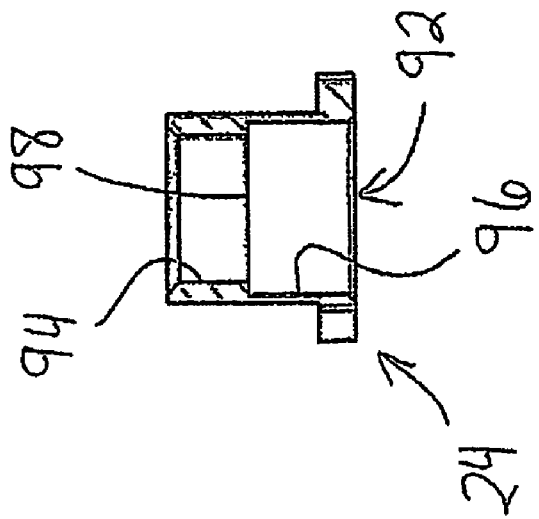
FIG. 16 is a cross-sectional view of the secondary spool of FIG. 15.

As required, detailed embodiments of the present invention are disclosed herein; however, it is to be understood that the disclosed embodiments are merely exemplary of the invention, which may be embodied in various forms. Therefore, specific details disclosed herein are not to be interpreted as limiting, but merely as a basis for the claims and as a representative basis for teaching one skilled in the art to variously employ the present invention in virtually any appropriate manner.

FIG. 1 illustrates a compact handheld adhesive applicator 10 according to an aspect of the present invention. FIG. 2 is an exploded view of the compact handheld adhesive applicator 10, which shows two subassemblies—a cartridge assembly 12 and a housing assembly 14. In one embodiment, the subassemblies are primarily comprised of a lightweight plastic material and are provided with at least one clip 16 that allows the cartridge assembly 12 to releasably lock into the housing assembly 14 without the need for tools, as will be described in greater detail hereinafter.

FIG. 3 is an isolated view of the cartridge assembly 12, with FIG. 4 showing an exploded view of the cartridge assembly 12. The cartridge assembly 12 is comprised of a cartridge body 18 onto which are secured a number of rotatable components, namely a roller 20, a primary or supply spool 22, and a secondary or take-up spool 24. The cartridge assembly 12 is also shown in FIG. 3 with an adhesive segment roll 26 preloaded on the primary spool 22, but it will be appreciated by those of ordinary skill in the art that the roll 26 may be provided separately from the cartridge assembly 12.

FIG. 5 is a rear perspective view of the cartridge body 18 and illustrates the cartridge clip 16. In one embodiment, perhaps best shown in FIG. 6, the cartridge clip 16 is integrally formed with the cartridge body 18, but the clip also be provided as a separate component of the cartridge assembly 12 without departing from the scope of the present invention. It may be advantageous for the clip 16 to be resiliently movable with respect to the remainder of the cartridge body 18 for purposes of loading the cartridge assembly 12 into the housing assembly 14, as will be described in greater detail herein. This may be achieved by a number of methods, such as by making the clip 16 relatively thin and/or cutting or otherwise removing part of the interface between the clip 16 and the remainder of the cartridge body 18.

The cartridge body 18 has a front portion 28, a rear portion 30, and an intermediate portion 32 between the front portion 28 and the rear portion 30 (FIG. 6). The front portion 28 includes a roller support 34 extending perpendicularly away from an inner surface 36 of the cartridge body 18. The illustrated roller support 34 is generally tubular with an inward radial extension or key 38 (FIG. 6). The function of the key 38 will be described in greater detail herein.

The roller support 34 is adapted to seat a generally tubular roller 20, as shown in FIG. 3. In one embodiment, illustrated in FIGS. 7 and 8, the roller 20 is comprised of a substantially tubular roller core 40 surrounded by a substantially tubular roller overmold 42. It may be advantageous for the roller core 40 to be comprised of a plastic material and for the roller overmold 42 to be comprised of an elastomeric material, but other materials may be employed without departing from the scope of the present invention.

FIG. 9 illustrates another embodiment of a roller 44 suitable for use with the roller support 34. The roller 44 may be of a unitary construction or employ the core-overmold design of FIGS. 7 and 8. In the embodiment of FIG. 9, the roller 44 has angled ends 46 at opposite sides of a substantially cylindrical midsection 48. A roller so provided may be advantageous to a purely cylindrical roller for a number of reasons. First, the angled ends 46 assist in centering the carrier strip of the adhesive segment roll during use. Also, the angled ends 46 maintain the outer surface of the roller in contact with the carrier strip to promote uniform tension in the carrier strip. Regardless of the particular configuration, the roller is rotatable about the roller support 34 for use in applying adhesive segments to an object, as will be described in greater detail herein.

An opposing faceplate 50, shown in FIGS. 3 and 4 and in greater detail in FIG. 10, serves as a roller cap. In the illustrated embodiment, the faceplate 50 mirrors the configuration of the housing body front portion 28 and includes a roller pin 52 extending perpendicularly away from the remainder of the faceplate 50. The illustrated roller pin 52 is generally cylindrical with a groove or notch 54 (FIG. 10) which may be advantageous for securing the faceplate 50 to the housing body front portion 28, as will be described in greater detail herein.

With the roller 20 seated on the roller support 34, the roller pin notch 54 is aligned with the roller support key 38 and the roller pin 52 is pressed into the roller support 34 (FIG. 4). By such a configuration, the roller 20 is prevented from being removed from the roller support 34, while still being allowed to freely rotate thereabout. As for the faceplate 50, the mating key-notch relationship between the roller support 34 and the roller pin 52 fixes the position of the faceplate 50 so that it provides a mirror image to the cartridge body front portion 28 and is configured to fit within the housing assembly 14 (FIG. 1).

The rear portion 30 of the cartridge body 18 is provided with a primary spool support 56 extending perpendicularly from the cartridge body inner surface 36. The illustrated primary spool support 56 is comprised of a plurality of extending tabs 58. At least one of the tabs 58 is resiliently movable for securing a primary spool 22, as shown in FIG. 3 and as will be described in greater detail herein.

The primary spool 22 is received on the primary spool support 56 for rotation thereabout. The primary spool 22 is shown in greater detail in FIG. 11 and is comprised of a disk-shaped gear portion 60 and a hub portion 62 extending away from one face of the gear portion 60. In one embodiment, the primary spool 22 is provided as a unitary molded plastic component. The outer circumference of the gear portion 60 includes a plurality of gear teeth 64 adapted to mesh with gear teeth of the secondary spool 24 and an advance gear, as will be described in greater detail below.

The hub portion 62 is adapted to receive a roll of adhesive material 26, as shown in FIG. 12. Typically, the roll 26 is fixed with respect to the hub portion 62 to control the rate at which adhesive segments are applied, as will be described in greater detail herein. According to one manner of fixing the roll 26 with respect to the hub portion 62, the hub portion 62 may be provided with an outward radial extension or key 66 (FIG. 11). The roll 26, in turn, may be provided with a tubular roll core 68 (FIGS. 12 and 13) including an interior notch 70 having a mating relationship with the key 66, such that the roll core 68 slides onto the hub portion 62, with the key 66 fitting within the notch 70. This configuration causes the roll 26 to rotate with the primary spool 22 about the primary spool support 56 during use of the compact handheld adhesive applicator 10.

With a roll 26 mounted on the hub portion 62, the primary spool 22 is pressed onto the primary spool support 56, with the hub portion 62 facing the cartridge body inner surface 36, as shown generally in FIG. 3. In the illustrated embodiment, the bore 72 of the primary spool 22 (FIG. 14) has a stepped construction, with a first portion 74 separated from a counterbore 76 of a larger diameter than the first portion. The counterbore defines a rim 78. The first portion 74 has an inner diameter which is slightly smaller than the outer diameter of the upper end of the primary spool support 56. Thus, pressing the primary spool 22 onto the primary spool support 56 will force the tabs 58 radially inwardly to fit within the bore 72. When the primary spool 22 has been fully pressed onto the primary spool support 56 the tabs 58 will resiliently return to their original configuration, hooking onto the rim 78 and holding the primary spool 22 against the cartridge body 18, as shown in FIG. 3.

The intermediate portion 32 of the cartridge body 18 is provided with a secondary spool support 80 extending perpendicularly from the cartridge body inner surface 36. The illustrated secondary spool support 56 is similar to the primary spool support 56, being comprised of a plurality of tabs 82, at least one of which is resiliently movable for securing a secondary spool 24. However, it will be noted that the secondary spool 24 is substantially smaller than the primary spool 22, as shown in FIG. 3.

Figure 15:
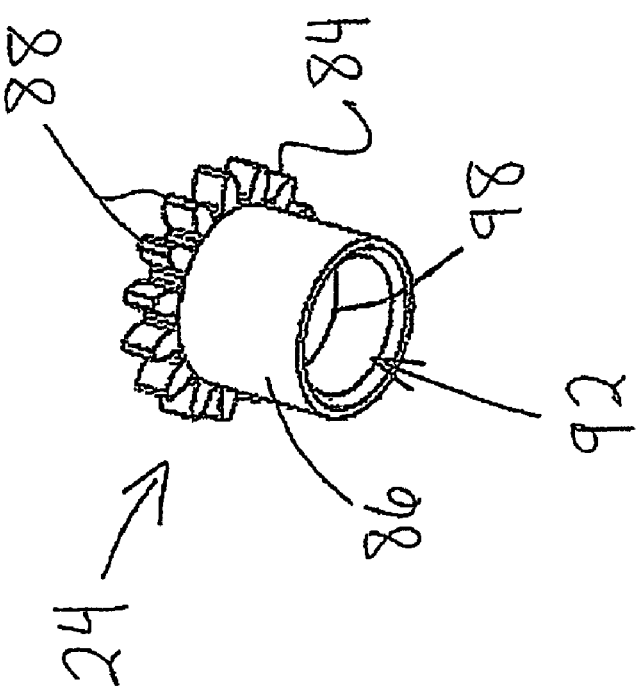
FIG. 15 is a perspective view of a secondary spool of the cartridge assembly of FIG. 3.

The secondary spool 24 is received on the secondary spool support 80 for rotation thereabout. The secondary spool 24 is shown in greater detail in FIGS. 15 and 16. Similar to the primary spool 22, the secondary spool 24 may have a disk-shaped gear portion 84 and a hub portion 86 extending away from one face of the gear portion 84. In one embodiment, the secondary spool 24 is provided as a unitary molded plastic component. The outer circumference of the gear portion 84 includes a plurality of gear teeth 88 adapted to mesh with the gear teeth 64 of the primary spool 22, as will be described in greater detail below.

The hub portion 86 is adapted to receive a slip sleeve 90, as shown in FIG. 4. The slip sleeve 90 is substantially tubular and slides over the hub portion 86. Advantageously, the friction between the hub portion 86 and the slip sleeve 90 is such that the slip sleeve 90 will rotate with the hub portion 86 until a sufficient resistive force holds the slip sleeve 90 stationary and causes it to slip over the rotating hub portion 86 (rather than rotating therewith) until the magnitude of the resistive force decreases. The function of this interaction between the hub portion 86 and the slip sleeve 90 will be described below in further detail.

With the slip sleeve 90 mounted on the hub portion 86, the secondary spool 24 is pressed onto the secondary spool support 80, with the hub portion 86 facing the cartridge body inner surface 36, as shown generally in FIG. 3. In the illustrated embodiment, the bore 92 of the secondary spool 24 (FIG. 16) has a stepped construction, with a first portion 94 of a smaller diameter separated from a counterbore 96 of a larger diameter. The counterbore 96 defines a rim 98. The first portion 94 has an inner diameter which is slightly smaller than the outer diameter of the upper end of the secondary spool support 80. Thus, pressing the secondary spool 24 onto the secondary spool support 80 will force the tabs 82 radially inwardly to fit within the bore 92. When the secondary spool 24 has been fully pressed onto the secondary spool support 80 the tabs 82 will resiliently return to their original configuration, hooking onto the rim 98 and holding the secondary spool 24 against the cartridge body 18, as shown in FIG. 2. When both spools have been secured to the cartridge body 18 their gear teeth will mesh together, as shown in FIG. 3. The interaction of the spools will be described subsequently.

Turning now to the housing assembly 14, it is shown in greater detail in FIG. 17. In the illustrated embodiment, the housing assembly 14 is comprised of a left housing body half 100 and a right housing body half 102. The right housing body half 102 is shown in greater detail in FIGS. 18 and 19, while the left housing body half 100 is shown in greater detail in FIGS. 20 and 21. The housing body halves may be joined to each other by any of a number of known means, including but not limited to ultrasonic welding. The joined housing body halves may be seen in FIG. 2.

Figure 22:
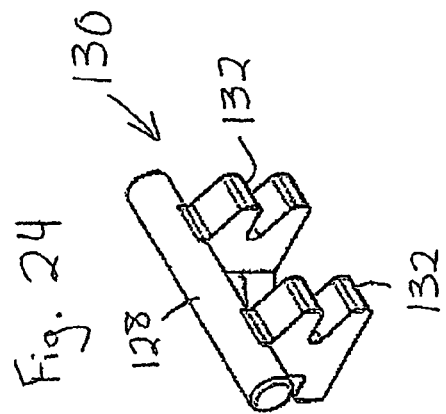
FIG. 22 is a perspective view of a leaf spring of the housing assembly of FIG. 17.
Figure 23:
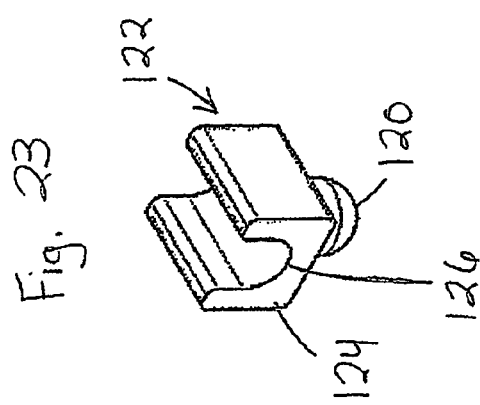
FIG. 23 is a perspective view of a ratchet driver of the housing assembly of FIG. 17.
Figure 24:
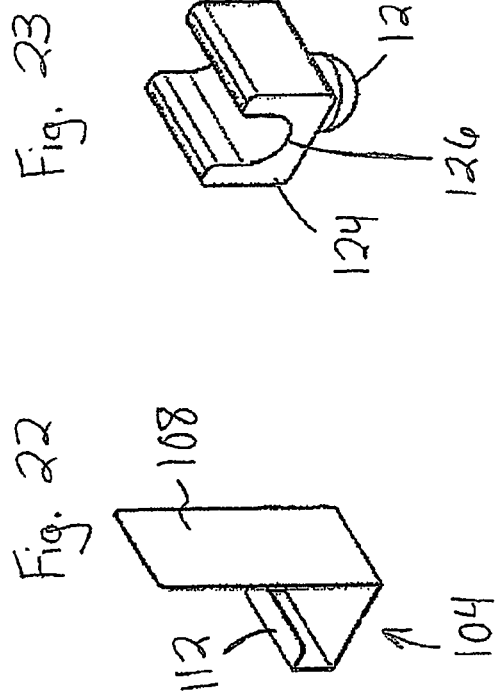
FIG. 24 is a perspective view of a ratchet of the housing assembly of FIG. 17.

When joined together, the housing body halves define a cavity which receives various drive mechanism components, all of which are illustrated in FIG. 17. Selected components are also individually shown in FIGS. 22-30. These components include a generally J-shaped leaf spring 104 (FIG. 22) which is adapted to be secured to a platform 106 (FIG. 19) extending perpendicularly from the right housing body half 102. The relationship between the leaf spring 104 and the platform 106 is shown in greater detail in FIGS. 31A and 31B. An upstanding backstop portion 108 of the leaf spring 104 fits within a slot 110 of the platform 106, while an overhang 112 of the leaf spring 104 grips onto the upper surface 114 of the platform 106. Advantageously, the leaf spring 104 may be comprised of a metallic material.

A short post 116 (FIG. 31A) extends upwardly from the upper surface 114 of platform 106 to support a ratchet driver spring 118. The ratchet driver spring 118 is a coil spring with an upper end that receives a downwardly extending post 120 of a ratchet driver 122. The ratchet driver 122, which is shown in greater detail in FIG. 23, has an upper portion 124 which sits atop the ratchet driver spring 118 and includes a channel 126. Typically, the ratchet driver 122 is seated atop the ratchet driver spring 118 with axis of the channel 126 arranged substantially parallel to the plane of the leaf spring backstop portion 108.

The channel 126 of the ratchet driver 122 receives a crossbar 128 of a ratchet 130, as shown in FIGS. 31A and 31B. The ratchet 130 is shown in greater detail in FIGS. 24-26. In the illustrated embodiment, two columns of ratchet teeth 132 extend downwardly from the crossbar 128. The topside 134 of each ratchet tooth 132 is inclined downwardly toward its free end, while the underside 136 of each ratchet tooth 132 is substantially horizontal. The ratchet teeth columns are sufficiently spaced from each other such that the ratchet driver spring 118 and the ratchet driver 122 may fit therebetween to access the ratchet crossbar 128. The rear of the gear teeth columns may be joined by a bridge member 138, best seen in FIG. 26. The back surface of the bridge member 138 may be substantially planar and adapted to abut the leaf spring backstop portion 108 when the ratchet 130 rotates about the crossbar 128, as will be described in greater detail below.

Each housing body half includes a support 140 (FIGS. 19 and 21) in the shape of an elongated oval to receive an end of the ratchet crossbar 128. The supports 140 are in facing relationship to each other and assure that the ratchet crossbar 128 is constrained to only linear displacement within the housing body cavity. In the illustrated embodiment, the supports 140 are elongated in a direction substantially parallel to the leaf spring backstop portion 108 and the ratchet driver spring 118, preferably along a line substantially coaxial with the ratchet driver spring 118. Accordingly, the ratchet crossbar 128 is constrained to move along a path tending to compress or decompress the ratchet driver spring 118.

The ratchet 130 is displaced by operation of a trigger 142. The trigger 142 is shown in greater detail in FIGS. 27-29. The trigger 142 extends in part outside of an upper surface of the housing assembly 14 to be operated by a user and extends in part inside of the housing body cavity to actuate the ratchet 130 (FIG. 32). The front end of the trigger 142 includes a tubular sleeve portion 144 adapted to receive a trigger pin 146 about which the trigger 142 is pivotal. The ends of the trigger pin 146 are received in opposing supports 147 of the housing body halves (FIGS. 19 and 21) to secure it and the trigger 142 within the housing body cavity.

The trigger 142 rests on the ratchet crossbar 128 (FIG. 32) and is biased to an up position by operation of the ratchet driver spring 118. When the trigger 142 is pressed by a user, it will compress the ratchet driver spring 118 and move the ratchet 130 toward the platform 106, which ultimately has the effect of manually paying out a length of the adhesive segment roll 26, as will be described in greater detail herein.

The final component of the drive mechanism is an advance gear 148, which is shown in greater detail in FIG. 30. The advance gear 148 has a pair of gear portions 150 each having a plurality of gear teeth 152. The gear teeth 152 of the advance gear 148 are adapted to mesh with the ratchet teeth 132, so it may be advantageous of the gear portions 150 to be separated by a distance substantially equal to the distance between the ratchet teeth columns.

Figure 20:
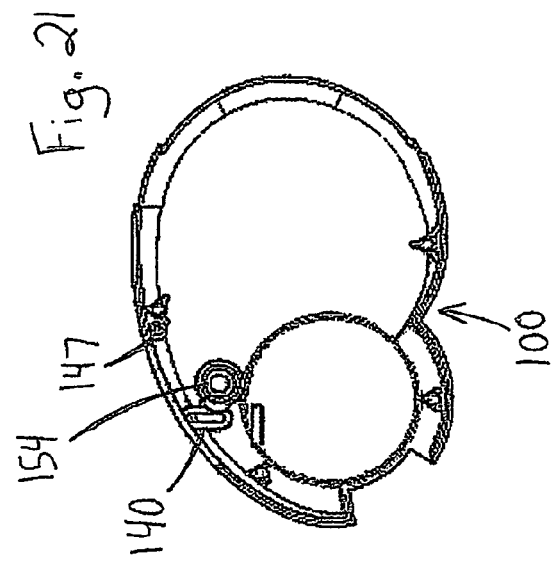
FIG. 20 is a rear perspective view of a left housing body half of the housing assembly of FIG. 17.
Figure 21:
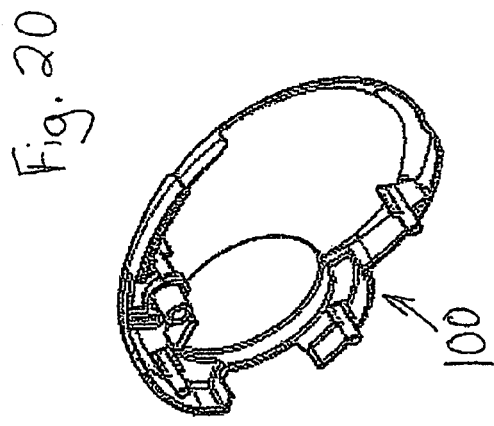
FIG. 21 is a side elevation view of the left housing body half of the housing assembly of FIG. 17, showing the interior thereof.

The advance gear 148 is rotatably mounted on a substantially cylindrical mounting member 154 of each housing body half (FIGS. 17 and 20). The mounting members 154 are provided in facing relationship to each other and received within a bore 156 of the advance gear 148. The mounting members 154 are positioned a selected distance from the platform 106 such that the gear teeth 152 of an advance gear 148 mounted on the mounting members 154 will mesh with the ratchet teeth 132 of the ratchet 130. When the trigger 138 is pressed by a user, the horizontal underside 136 of the ratchet teeth 132 will engage the gear teeth 152 of the advance gear 148 and rotate the advance gear 148 in a forward direction. Releasing the trigger 138 decompresses the vertical spring 118, thereby moving the ratchet 130 and ratchet teeth 132 upwardly to their original position. Rather than rotating the advance gear 148 in the reverse direction, the inclination of the topside 134 of the ratchet teeth 132 is such that it allows the ratchet teeth 132 to move past the gear teeth 152 of the advance gear 148 without rotating them. The benefits provided by this ratcheting effect will be described in greater detail herein.

The cartridge assembly 12 is connected to the housing assembly 14 as follows. The cartridge assembly 12, beginning with the front portion 28, is pressed into a rear opening 158 (FIG. 2) of the housing assembly 14. It will be seen from FIG. 17 that the housing body halves are asymmetrical, with the rear opening 158 being defined by the lack of material at the rearmost section of the right housing half 102. The front and intermediate portions of the cartridge assembly 12 may be narrower than the housing body cavity, which allows them to move therethrough relatively easily until part of the front portion 28 extends through a front opening 160 (FIG. 2) of the housing assembly 14. At or around this position, the cartridge clip 16 will abut a portion of the right housing half 102. In one embodiment, the cartridge clip 16 is configured to have only a small degree of interference with the right housing half 102 and is provided with an angled leading surface 161 (FIG. 5), such that continuing to press the cartridge assembly 12 will cause the cartridge clip 16 to resiliently move into the housing body cavity and eventually settle within a clip channel 162 (FIG. 19), thereby locking the cartridge assembly 12 in place, as shown in FIG. 1. When installed, the gear teeth 64 of the primary spool 22 will mesh with the gear teeth 152 of the advance gear 148.

If the cartridge assembly 12 is to be removed, the clip 16 is pressed into the housing body cavity and the cartridge assembly 12 is pulled away from the rear opening 158 of the housing assembly 14.

Prior to inserting the cartridge assembly 12 into the housing assembly 14, an adhesive segment roll 26 is installed on the primary spool 22. The exact configuration of the adhesive segment roll 26 may vary without departing from the scope of the present invention. In one suitable embodiment, illustrated in FIG. 33, pressure-sensitive adhesive segments 164 are supplied on a release liner in the form of a sheet or a carrier strip 166, configured as a roll 26. The roll 26 may have a relatively small diameter, such as no more than approximately 2.5 inches, which in turn allows the compact handheld adhesive applicator 10 to be relatively small. The adhesive segments 164 are secured to a low surface energy release surface 168 of the carrier strip 166. The release surface 168, which may be provided as a silicone coated surface, allows the pressure-sensitive adhesive segments 164 to release or be removed from the carrier strip 166. The measurement of surface energy is generally determined by the level of attraction between the molecules located at the surface of an object; higher attraction between molecules located at the surface generally equates with a high surface energy, and lower attraction between molecules located at the surface generally equates with a low surface energy. Higher surface energy surfaces generally have a stronger adhesion to adhesives because the higher attractive forces of the molecules have a greater attraction to the adhesive. Conversely, lower surface energy surfaces generally have a weaker adhesion to adhesives. The differential in surface energies is what allows a pressure-sensitive adhesive segment to be transferred from a carrier strip to the surface of an object.

The carrier strip 166 is wound about a spool with the adhesive segments 164 facing outwardly. The adhesive segments 164 contact the rear surface 168 of the portion of the carrier strip 166 overlaying them, but the rear surface 168 has a relatively low surface energy and adhesion, such that the adhesive segments 164 detach from the rear surface 168 without detaching from the release surface 168 as the roll 26 is unwound.

To install the roll 26, it is first mounted on a roll core 68, according to the foregoing description, and the roll core 68 is slid onto the hub portion 62 of the primary spool 22. The roll 26 is mounted such that the carrier strip 166 is dispensed in an underhand manner, as shown in FIG. 32. The carrier strip 166 is wrapped below the roller 20 and then is passed back to the intermediate portion 32 of the cartridge body 18. In another embodiment, the cartridge assembly may be provided with a second roller (not illustrated) positioned between the roller 20 and the primary spool 22, such that the carrier strip 166 is wrapped over the second roller before being wrapped below the illustrated roller 20. At the intermediate portion 32, the carrier strip 166 is brought upwardly between the primary and secondary spools and wrapped over the slip sleeve 90 of the secondary spool 24. The carrier strip 166 is affixed to the slip sleeve 90 by any of a number of methods, for example by splice tape, such that the bare carrier strip 166 winds around the slip sleeve 90 as the adhesive segments 164 are applied to an object.

With the roll 26 installed in the cartridge assembly 12, the cartridge assembly 12 may be loaded into the housing assembly 16 according to the foregoing description. In one embodiment, the cartridge assembly may be durable, wherein a cartridge assembly with an empty roll is removed from the housing assembly, the spent roll is replaced with a new roll, and the cartridge is thereafter reinstalled. In another embodiment, the cartridge assembly is provided to the user with an adhesive segment roll pre-loaded and is disposable. When the roll is spent, the entire cartridge assembly may be quickly replaced with another pre-loaded cartridge assembly. This latter embodiment may be preferred because it does not require the user to feed the carrier strip through the cartridge assembly, thereby saving a substantial amount of time.

The compact handheld adhesive applicator 10 may be used in a number of ways. According to two exemplary methods of use, the compact handheld adhesive applicator 10 can be used for either glide-type applications or single segment applications. To perform a glide-type application, a lead adhesive segment 164 is positioned to face away from the roller 20 and then pressed against an object. The user grips the housing assembly and moves the compact handheld adhesive applicator 10 downwardly or rearwardly (with respect to the orientation of FIG. 32) while continuing to press the carrier strip 166 against the recipient using the roller 20. The carrier strip 166 advances to the next adhesive segment 164 and the user continues this movement of the compact handheld adhesive applicator 10 until the desired number of adhesive segments have been applied to the recipient.

The operation of selected components within the housing assembly 14 during such a glide-type application is noteworthy. First, it will be seen that advancing the carrier strip 166 rotates the primary spool 22, which causes the secondary spool 24 to rotate (FIG. 32) due to the engagement of gears 64 and 88. This driving action wraps the spent portion of the carrier strip 166 around the slip sleeve 90 of the secondary spool 24. However, as shown in FIG. 32, the diameter of the gear portion 60 of the primary spool 22 is greater than the diameter of the hub portion 86 of the secondary spool 24, meaning that the secondary spool 24 must rotate relatively quickly to stay synchronized with the primary spool 22 as the adhesive segments 164 are dispensed. The slip sleeve 90 (to which the carrier strip 166 is affixed) operates to provide a rotational speed differential mechanism that prevents the difference in rotational speed from damaging the carrier strip 166.

The difference in rotational speed creates tension in the carrier strip 166 which, in turn, provides a resistive force that resists the tendency of the slip sleeve 90 to rotate with the secondary spool 24. The slip sleeve 90 and the underlying hub portion 86 of the secondary spool 24 are configured such that the friction therebetween is great enough to overcome the resistive force imparted by the carrier strip 166, thereby causing the slip sleeve 90 to rotate with the secondary spool 22 and further increasing the tension in the carrier strip 166. When the tension in the carrier strip 166 reaches a threshold level (preferably less than the tensile strength of the carrier strip 166), the resistive force imparted by the tension will overcome the friction between the slip sleeve 90 and the hub portion 86 and cause the slip sleeve 90 to slip, i.e., remain stationary while the secondary spool 24 continues to rotate. The tension in the carrier strip 166 decreases as the slip sleeve 90 slips over the hub portion 86, thereby decreasing the resistive force imparted to the slip sleeve 90. When the resistive force is sufficiently small, the slip sleeve 90 will begin to again rotate with the secondary spool 24 and the self-corrective process of alternating rotating and slipping is repeated. Thus, it can be seen that the slip sleeve and hub portion 96 act as a clutch, which also accommodates the differential and constantly changing diameters of the amount of tape on the respective spools.

According to another method of using the compact handheld adhesive applicator 10, single adhesive segments may be applied by a manual advance system. Such a method requires the use of the trigger 142. Squeezing the trigger 142 presses the ratchet 130 toward the platform 106. This movement of the ratchet 130 causes the undersides 136 of the ratchet teeth 132 to engage the gear teeth 152 of the advance gear 148 (FIG. 31A) and rotate the advance gear 148 a controlled amount in the forward direction. The ratchet teeth 132 stay engaged with the gear teeth 152 of the advance gear 148 for substantially the duration of a downstroke of the trigger 142 to rotate the advance gear 148, thereby driving the primary spool 22 to pay out a length of the carrier strip 166, The amount of carrier strip 166 paid out by a complete trigger squeeze may vary, but in one embodiment the carrier strip 166 will be moved a distance equal to the distance between corresponding points of adjacent adhesive segments 164. This is advantageous for operations requiring the repeated application of a single adhesive segment, because a first adhesive segment can be properly positioned and applied, then the next adhesive segment may be advanced to the proper position by one full squeeze of the trigger. The system may also allow for incremental advancement of the carrier strip, with a half squeeze of the trigger advancing the carrier strip half the distance achieved by a complete squeeze. This may be advantageous for fine adjustments to the position of the carrier strip and adhesive segments, and may also be used to position the carrier strip in preparation for a glide-type application.

When the trigger 142 is released, the ratchet driver spring 118 decompresses and the ratchet 130 moves back to its initial position of FIG. 31A. However, rather than the ratchet teeth 132 engaging the gear teeth 152 of the advance gear 148 and driving the system in reverse, the ratchet teeth 132 will "slip" or "jump" past the gear teeth 152 of the advance gear 148, maintaining the carrier strip 166 in the expected position when the trigger 142 is released. This "slipping" action is made possible by the inclined topsides 134 of the ratchet teeth 132 and the orientation of the leaf spring 104. Releasing the trigger 142 moves the ratchet 13 upwardly, bringing the topsides 134 of the ratchet teeth 132 into contact with the stationary gear teeth 152 of the advance gear 148. This contact causes the ratchet 130 to rotate about the crossbar 128 until the bridge member 138 abuts the leaf spring backstop portion 108. The space between the bridge member 138 and the backstop portion 108 is greatest when the trigger 142 is fully pressed (FIG. 31B), so the ratchet teeth 132 are allowed to rotate substantially out of engagement with the gear teeth 152 of the advance gear 148. The ratchet 130 slides upwardly along the leaf spring backstop portion 108, with the ratchet teeth 132 "slipping" past the gear teeth 152 of the advance gear 148. The orientation of the backstop portion 108 rotates the ratchet teeth 152 back into engagement with the teeth 152 of the advance gear 148 as the ratchet 130 moves upwardly, such that the ratchet 130 returns to the initial position of FIG. 31A when the trigger 142 is fully released.

The compact handheld adhesive applicator 10 is used until the roll 26 is empty, at which time the roll 26 or the entire cartridge assembly 12 is replaced. To assist in monitoring the status of the roll 26, a portion 172 (FIG. 17) of the left housing half 100 corresponding generally to the rear portion 30 of the cartridge assembly 12 may be comprised of a substantially transparent material. This allows the user to view the roll 26 during use and anticipate when a replacement will be needed.

Figures 34, 35:
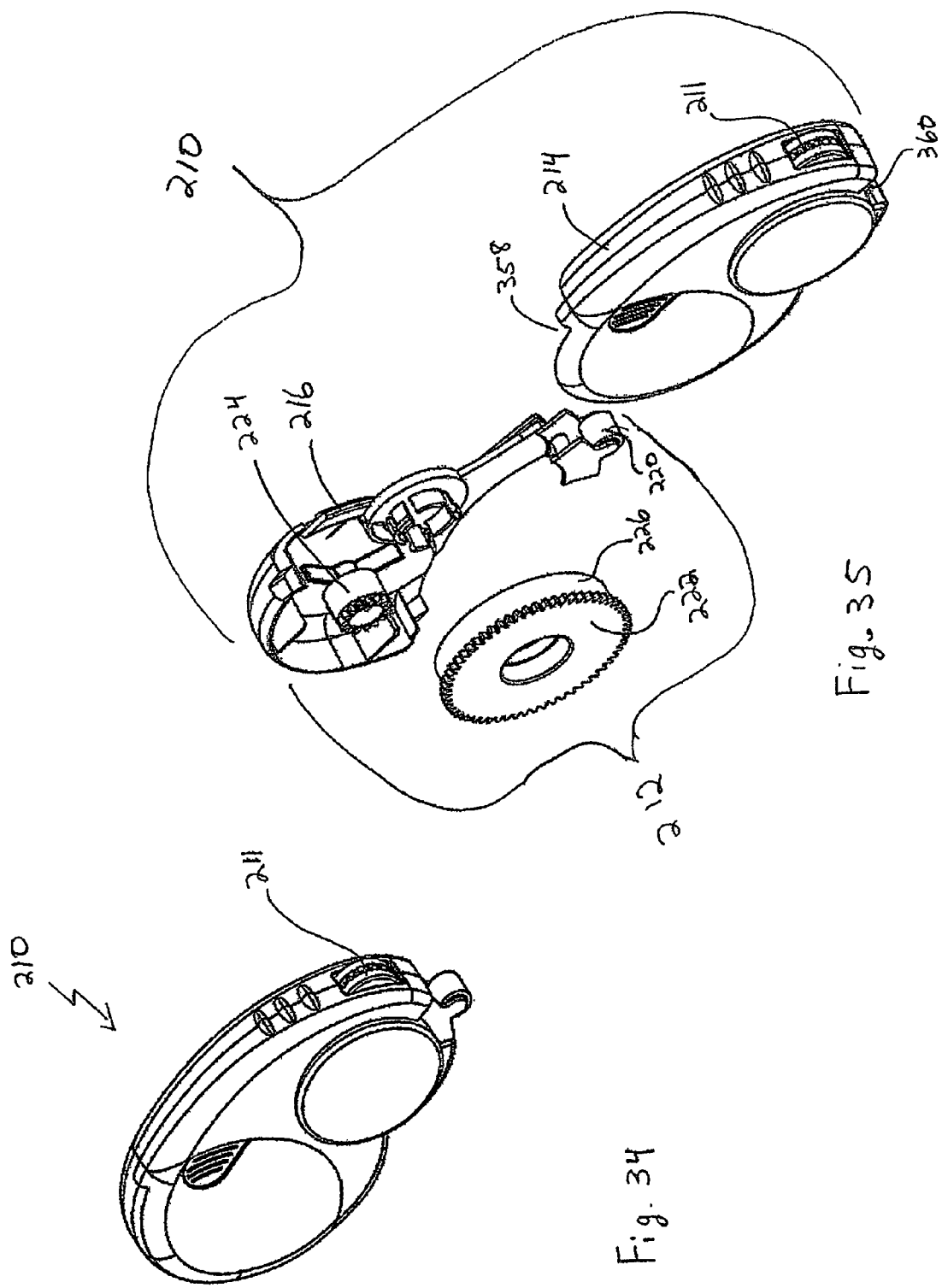
FIG. 34 is a front perspective view of another embodiment of a compact handheld adhesive applicator according to an aspect of the present disclosure.
FIG. 35 is an exploded view of the compact handheld adhesive applicator of FIG. 34.

FIGS. 34 and 35 illustrate another embodiment of a compact handheld adhesive applicator 210 of the present disclosure. Compact handheld adhesive applicator 210 includes a manual carrier strip advancement feature that can be employed to advance a single adhesive segment into position for application or can be used to take-up slack in the carrier strip. In the illustrated embodiment, the manual advancement feature includes a track wheel 211 that can be rotated by a user to manually advance the carrier strip a desired amount.

FIG. 35 is an exploded view of the compact handheld adhesive applicator 210. Compact handheld applicator 210 includes two subassemblies—a cartridge assembly 212 and a housing assembly 214. When the cartridge assembly 212 and the housing assembly 214 are joined together for use, a clip 216 of the cartridge assembly 212 removably locks the cartridge assembly 212 to the housing assembly 214.

FIG. 36 is an isolated view of the cartridge assembly 212 (shown without the primary spool) and FIG. 37 shows an exploded view of the cartridge assembly 212. The cartridge assembly 212 includes a cartridge body 218 on which are secured a number of rotatable components, namely a roller 220, a primary spool 222 (FIG. 37) and a secondary spool 224. FIG. 38 is a rear perspective view of the cartridge assembly 212. As illustrated, the cartridge body 218 includes an elongated guide member 219 extending along the outer surface of the cartridge body 218. When the cartridge assembly 212 and housing assembly 214 are assembled together for use, the elongated guide member 219 is received into a guide slot 221 (FIG. 42) of the housing assembly, as explained in greater detail below.

Referring to FIGS. 36 and 37, the cartridge body 218 includes a front portion 228, a rear portion 230 and an intermediate portion 232 between the front portion 228 and the rear portion 230. As shown in FIG. 37, the front portion 228 includes a roller support 234 that is adapted to seat the generally tubular roller 220 when the cartridge assembly is assembled (FIG. 36). The roller 220 can be generally similar to rollers 20 and 44 described above with respect to FIGS. 7, 8 and 9. The roller 220 is secured between the cartridge body 218 and an opposing face plate 250 as illustrated in FIGS. 36 and 37.

The intermediate portion 232 of the cartridge body 218 is provided with a primary spool support structure 256, and the rear portion 230 is provided with a secondary spool support structure 280, as illustrated in FIG. 37. The primary spool support structure 256 extends perpendicularly from the inner surface of the cartridge body 218 and includes a plurality of tabs 258 extending therefrom. At least one of the tabs 258 is resiliently movable for allowing the primary spool 222 to be secured to the primary spool support structure 256.

The primary spool 222 is received on the primary spool support 256 for rotation thereabout. In FIGS. 35 and 37, the primary spool 222 is shown preloaded with a roll of adhesive tape 226. The primary spool 222 is shown in greater detail in FIGS. 39-41 and includes a disk-shaped gear portion 260 and a hub portion 262. The hub portion 262 extends away from one face of gear portion 260. The outer circumference of gear portion 260 includes gear teeth 264 that are adapted to mesh with the gear teeth of secondary spool 224 and the gear teeth of an idler gear 308 (FIG. 42) of the housing assembly 214, as will described in more detail below.

The hub portion 262 is adapted to receive a roll of adhesive tape 226, as illustrated in FIGS. 40 and 41. In this embodiment, the hub portion 262 is provided with a plurality of outwardly extending projections 266 that are space apart around the circumference of the hub portion 262. As shown in FIG. 40, the roll of adhesive tape 226 includes a core 268 that slides over the hub portion 262. The core 268 is sized to frictionally engage the plurality of projections 266. The snug fit between the core 268 of the roll 226 and the projections 266 of the hub portion 262 causes the roll 226 to be removably secured to primary spool 222. During use of the compact handheld applicator 210, the roll 226 rotates with the primary spool 222 about the primary spool support 256.

The primary spool 222 is attached to the spool support 256 in a manner generally similar to that which is described above with respect to the previous embodiment. With the hub portion 262 of the primary spool 222 facing the cartridge body 218, the primary spool 222 is pressed onto the primary spool support 256. As the primary spool 222 is pressed onto the primary spool support 256, the tabs 258 are forced radially inwardly to fit within the bore 272 of the primary spool. When the primary spool 222 is fully assembled with cartridge body 218, the tabs 258 hook onto a rim 278 (FIG. 37) of the bore 272 to secure the primary spool 222 to the cartridge body 218. It will be understood that both of the primary spools 22 and 222 described herein, along with other primary spools of different construction, are suitable for use in either embodiment of the compact handheld applicators 10 and 210.

As illustrated in FIG. 37, the secondary spool support structure 280 is located at the rear portion 230 of the cartridge body 218 and extends perpendicularly from the inner surface of the cartridge body. The secondary spool support structure 280 includes a plurality of tabs 282 and at least one of the tabs is resiliently movable for attachment of the secondary spool 224 to the cartridge body 218. In the illustrated embodiment, the secondary spool support structure 280 includes a plurality of spacers 281 that space the secondary spool 224 from the inner surface of the cartridge body 218.

The secondary spool 224 is received on the secondary spool support structure 280 and rotates thereabout. The secondary spool 224 of this embodiment is generally similar to the secondary spool 24 illustrated in FIGS. 15 and 16. As illustrated in FIG. 37, the secondary spool 224 can have a disk-shaped gear portion 284 and a hub portion 286. The outer circumference of the gear portion 284 includes a plurality of gear teeth 288 adapted to mesh with the gear teeth 264 of the primary spool 222. Additionally, the hub portion 286 is adapted to receive a slip sleeve 290 which generally serves the same function as the above described slip sleeve 90. With the slip sleeve 290 mounted on the hub portion 286, the secondary spool 224 is pressed onto the secondary spool support 280, as generally shown in FIG. 36.

Figure 46:
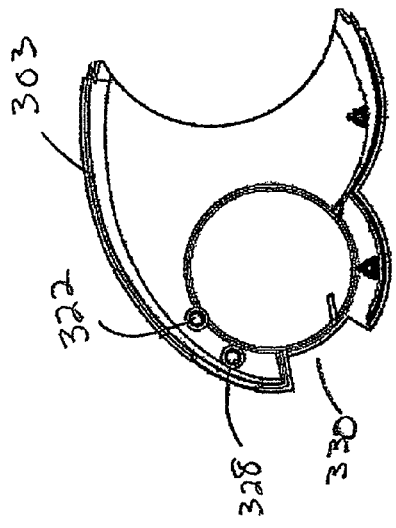
FIG. 46 is a side elevation view of the front portion of the left body half of the housing assembly of FIG. 42, showing the interior thereof.
Figure 45:
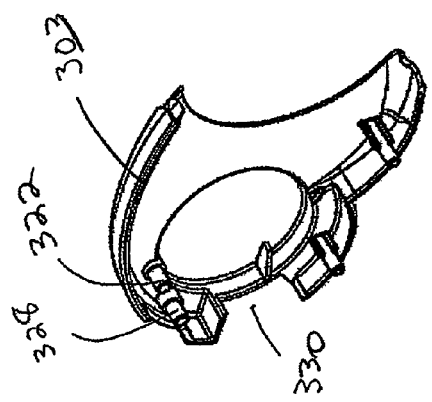
FIG. 45 is a perspective view of the front portion of the left body half of the housing assembly of FIG. 42.
Figure 47:
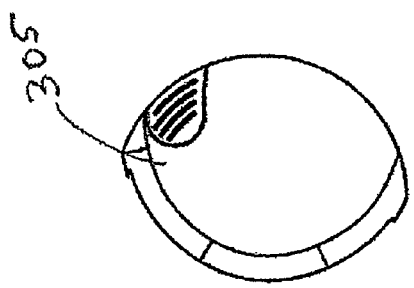
FIG. 47 is a side elevation view of the rear portion of the left body half of the housing assembly of FIG. 42.

Referring to FIG. 42, the housing assembly 214 is comprised of a left housing body half and a right housing body half 302. The right body half 302 is shown in more detail in FIGS. 43 and 44, and the left body half 300 is shown in more detail in FIGS. 45, 46 and 47. The left body half 300 includes a front portion 303 and a rear portion 305. The left body half 300 can be comprised of a single molded piece, or the rear portion 305 (FIG. 47) can be overmolded onto the front portion 303 (FIGS. 45 and 46). Further, the left and right body halves 300 and 302 can be joined together by any of the means described herein, or any other suitable means. When joined together, the housing body halves 300, 302 define a cavity which houses the manual advancement drive components, namely the track wheel 211 and an idler gear 308.

Figure 48:
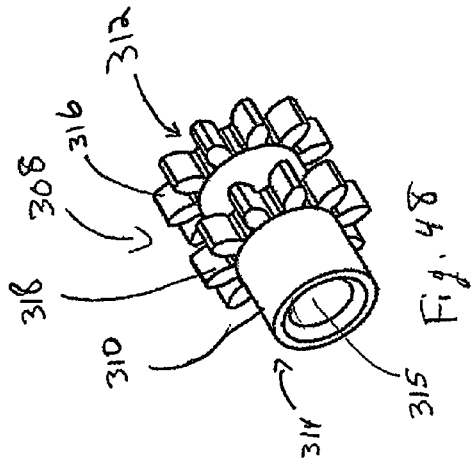
FIG. 48 is a perspective view of one embodiment of an idler gear of the housing assembly of FIG. 42.

The idler gear 308, which is shown in more detail in FIG. 48, includes a generally hollow elongated shaft 310 having a first end portion 312 and a second end portion 314 with a bore 315 passing therethrough. The idler gear 308 includes a first set of gear teeth 316 and a second set of gear teeth 318. The first set of gear teeth 316 extends around the circumference of the first end portion 312 of the idler gear 308, and the second set of gear teeth 318 extends around the circumference of the idler gear 308 at a location that is about midpoint between the first and second end portions 312 and 314 of the idler gear 308.

The idler gear 308 is secured within the housing assembly 214 by opposing idler gear supports that extend from the left and right body halves 300, 302. As illustrated in FIGS. 42 and 44, the right body half 302 includes an idler gear support 320 that extends from the inner surface of the right body half 302. The left body half 300 includes an opposing idler gear support 322 that extends from the inner surface of the front portion 303 of the left body half 300, as illustrated in FIGS. 45 and 46. When the housing assembly 214 is assembled, the idler gear support 322 of the left body halve 300 extends into the opening of the bore at the first end portion 312 of the idler gear 308 and the idler gear support 320 of the right body half 302 extends into the opening of the bore at the second end portion 314 of the idler gear 308. When driven, the idler gear 308 rotates about the idler gear supports 320 and 322.

Figure 49:
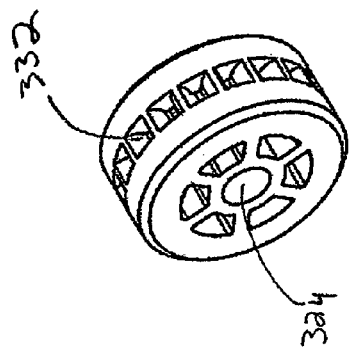
FIG. 49 is a perspective view of one embodiment of a track wheel of the housing assembly of FIG. 42.

The track wheel 211 is shown in more detail in FIG. 49 and has a generally cylindrical shaped body that includes a central passageway 324 extending therethrough. The central passageway 324 has an opening on either side of the track wheel 211. The track will 211 is secured to the housing assembly 214 by opposed track wheel supports that extend from the left and right body halves 300, 302. As illustrated in FIGS. 42 and 44, the right body halve 302 includes a track wheel support 326 that extends from the inner surface of the right body half 302. The left body half 300 includes an opposing track wheel support 328 that extends from the inner surface of the front portion 303 of the left body half 300. When the housing assembly 214 is assembled, the track wheel support 326 of the right body half 302 extends into the passageway opening of one side of the track wheel 211, and the track wheel support 328 of the left body half 300 extends into the passageway opening of the other side of the track wheel 211. The track wheel 211 rotates about the track wheel supports 326, 328.

When the track wheel 211 is assembled within the housing assembly 214, the track wheel 211 is positioned within an opening 330 (partially shown in FIGS. 42 and 44-46) in the wall of the housing assembly so that a portion of the track wheel 211 is within the cavity and a portion of the track wheel is exposed. The track wheel 211 can be rotated about the supports 326, 328 by contacting the track wheel 211, typically by hand, and applying force. The track wheel also includes a plurality of recesses 332 (FIG. 49) that extends circumferentially around the track wheel. The recesses 332 of track wheel 211 mesh with the second set of gear teeth 318 of the idler gear 308. Thus, the track wheel 211 drives the idler gear 308 when the wheel track is rotated.

The cartridge assembly 212 is connected to the housing assembly 214 as follow. The elongated guide member 219 of cartridge body 218 (FIG. 38) is inserted into slot 221 (FIG. 42) of the housing assembly 214. The cartridge assembly 212 is then pressed into the rear opening 358 (FIG. 35) of the housing assembly 214. The mating between the guide member 219 and slot 221 assists in properly aligning the cartridge assembly 212 and housing assembly 214 during insertion and assists in securing the cartridge assembly to the housing assembly. When the cartridge assembly 212 is fully inserted into the housing assembly 214, the front portion 228 extends through a front opening 360 (FIG. 35) of the housing assembly 214. Additionally, clip 216 of the cartridge assembly 212 engages the right housing half 302 to removable lock the cartridge assembly into place, as illustrated in FIG. 34. When the cartridge assembly 212 is installed, the gear teeth 264 (FIG. 37) of the primary spool 222 mesh with the gear teeth 316 (FIGS. 42 and 48) of idler gear 308.

The compact handheld adhesive applicator 210 may be used in a number of ways. For example, the compact handheld adhesive applicator 210 can be used in glide-type applications to apply multiple adhesive segments or in a single segment application. Referring to FIG. 50, to provide a glide-type application, a lead adhesive segment 364a is positioned to face away from roller 220 and then is pressed against an object. The user moves the compact adhesive applicator in a downward or rearward direction while continuing to press the carrier strip 366a against the recipient object. The carrier strip 366a advances to the next adhesive segment 364b into position and the user continues this movement of the compact handheld adhesive applicator 210 until the desired number of adhesive segments have been applied to the recipient object.

As illustrated in FIG. 50, as the carrier strip 366a is advanced, the carrier strip 366a rotates the primary spool 222, which causes the secondary spool 224 to rotate due to the engagement of gear teeth 264 and 288. This driving action wraps the spent portion of the carrier strip 366b around the slip sleeve 290 of the secondary spool 224. As illustrated in FIGS. 37 and 50, the diameter of the gear portion 260 of the primary spool 222 is greater than the diameter of the hub portion 286 of the secondary spool 224, meaning the secondary spool 224 must rotate relatively quickly to stay synchronized with the primary spool 222 as the adhesive segments 364 are dispensed. The slip sleeve 290 operates in generally the same manner as the slip sleeve 90 discussed above and prevents the difference of rotational speed from damaging the carrier strip 366.

According to one embodiment of a single segment application method, single adhesive segments can be applied by the manual advancement system. Such a method requires the use of track wheel 211. With reference to FIG. 50, track wheel 211 is rotated in a counterclockwise direction, typically by a user's finger or thumb. The meshing between the recesses 332 (FIG. 49) of the track wheel 211 and the gear teeth 318 (FIG. 48) of the idler gear 308 causes idler gear 308 to rotate in a clockwise direction. As the idler gear 308 rotates, the meshing between gear teeth 316 (FIG. 48) of the idler gear 308 and gear teeth 264 of primary spool 222 drives the primary spool 222 in a counterclockwise direction. As the primary spool 222 rotates, it pays out a length of carrier strip 366a. Additionally the meshing of gear teeth 264 of the primary spool 222 and gear teeth 288 of secondary spool 224 causes the secondary spool 224 to rotate in a clockwise direction and take up the spent carrier strip 366b. The length of carrier strip paid out varies and is advantageously controlled by the user. Preferably, the user sufficiently rotates the track wheel 211 to cause the primary spool 222 to pay out enough of the carrier strip 366a to position a single adhesive segment 364a in the proper position for application. After application of the single segment, the user can again rotate the track wheel 211 to pay out another length of the carrier strip and advance the next adhesive segment 364b into position.

Occasionally during use, slack can occur in the carrier strip 366 between the primary spool 222 and secondary spool 224. Advantageously, the track wheel 211 can also be used to take-up this slack. To take-up slack, the user simple rotates the track wheel 211 in a counterclockwise direction. Because of the above mentioned gear ratio, the secondary spool 224 rotates relatively more quickly than the primary spool 222. The differential in the rate of rotation between the spools 222, 224 causes the secondary spool 224 to take-up more carrier tape then is let out by the primary spool 222, thereby taking-up any slack in the carrier tape between the primary and secondary spools.

Figure 52:
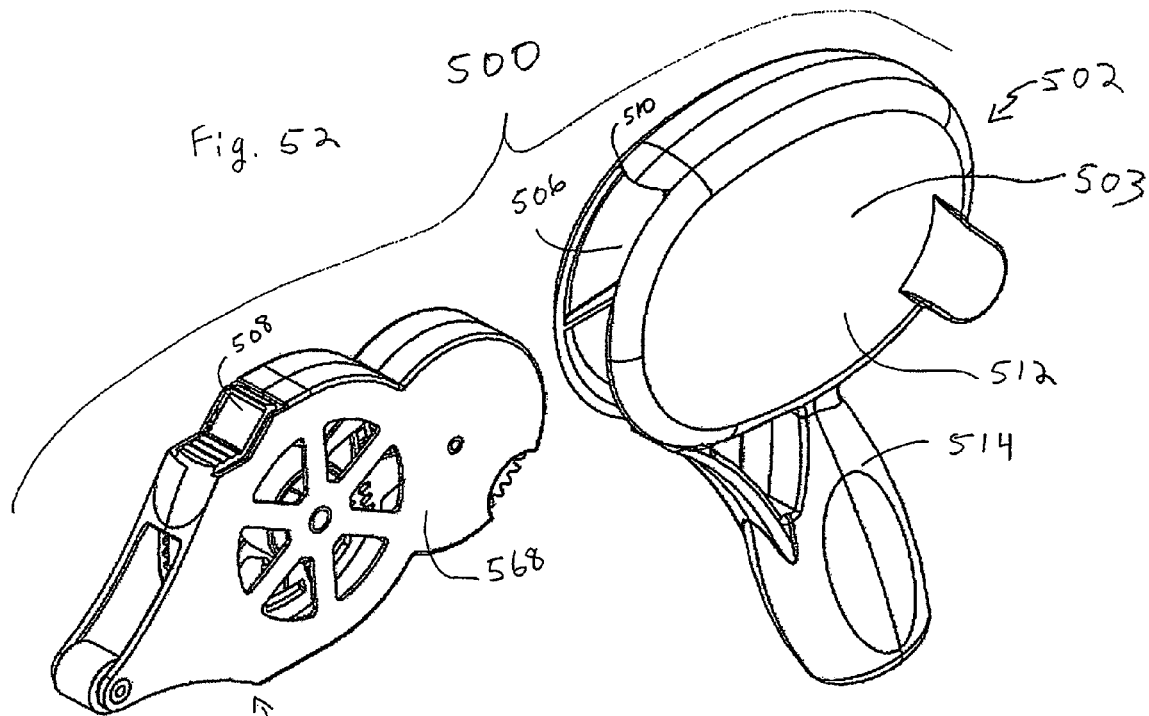
FIG. 52 is an exploded view of the handheld applicator of FIG. 51.
Figure 53:
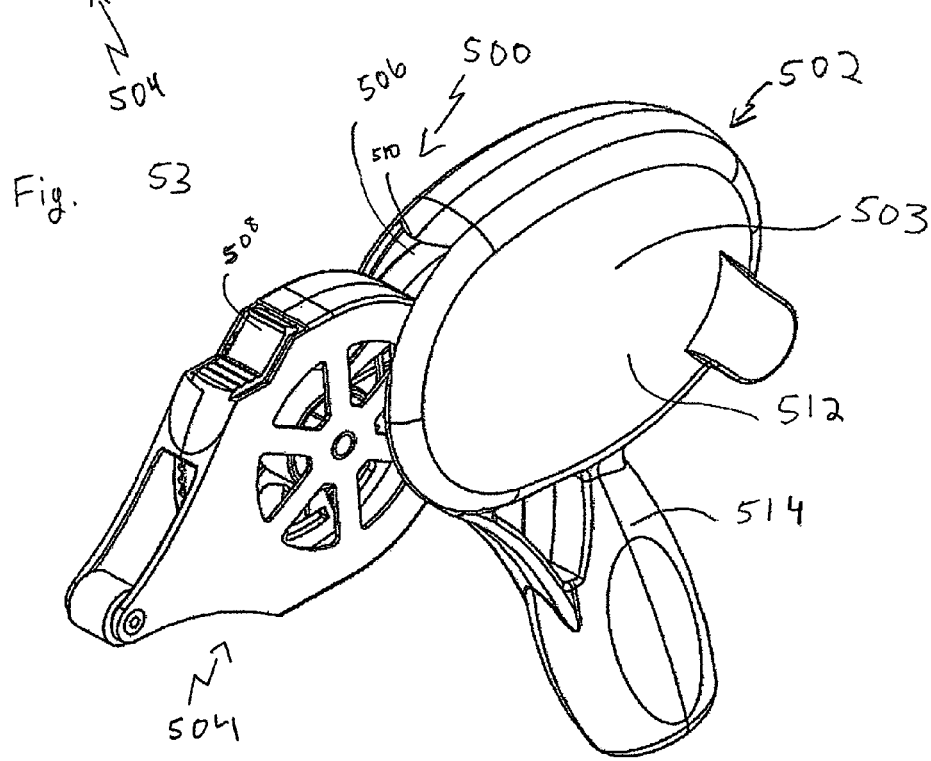
FIG. 53 is a perspective view of the handheld applicator of FIG. 52.

FIGS. 51, 52 and 53 illustrate another embodiment of a handheld applicator 500, which includes a disengageable manual carrier strip advancement member that can be employed to advance the carrier strip or liner a desired amount to place a selected portion of adhesive into position for application of the adhesive to an object. In one embodiment, the disengageable advancement member can also be employed to remove carrier strip slack that may occur between the primary and secondary spools. Handheld applicator 500 includes a housing assembly 502 and a cartridge assembly 504. When joined together, cartridge assembly 504 is received into cavity 506 defined by housing assembly 502, and clip 508 of cartridge assembly 504 engages portion 510 of housing assembly 502 to releasably mount the cartridge assembly to the housing assembly 502. In one embodiment, cartridge assembly 504 is a disposable cartridge that can be easily replaced after the cartridge is spent.

Figure 54:
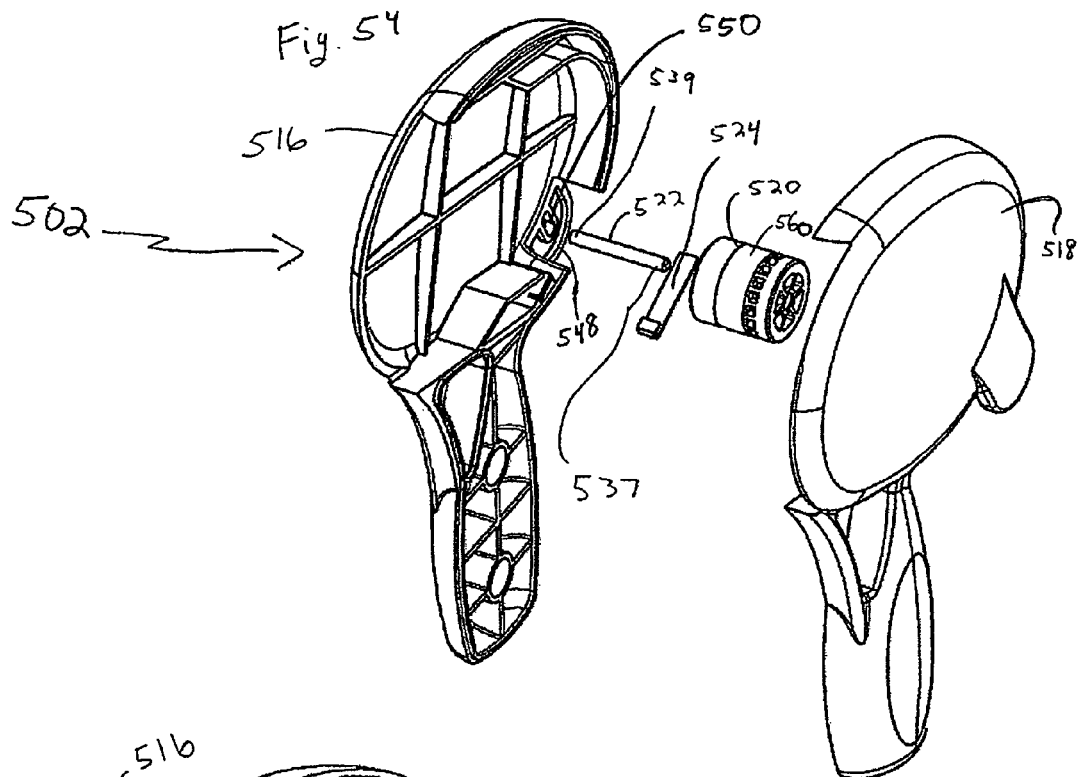
FIG. 54 is an exploded view of the housing assembly of the handheld applicator of FIG. 52.

Housing assembly 502 includes a housing body 503 having an upper body portion 512 and a lower or handle portion 514. Handle portion 514 preferably is ergonomically designed to be comfortably gripped by the hand of a user. Referring to FIG. 54, housing assembly 502 includes two generally similar housing body halves 516 and 518, a disengageable advancement member, such as track wheel 520, a track wheel mounting pin 522 and a leaf spring 524.

Figure 56:
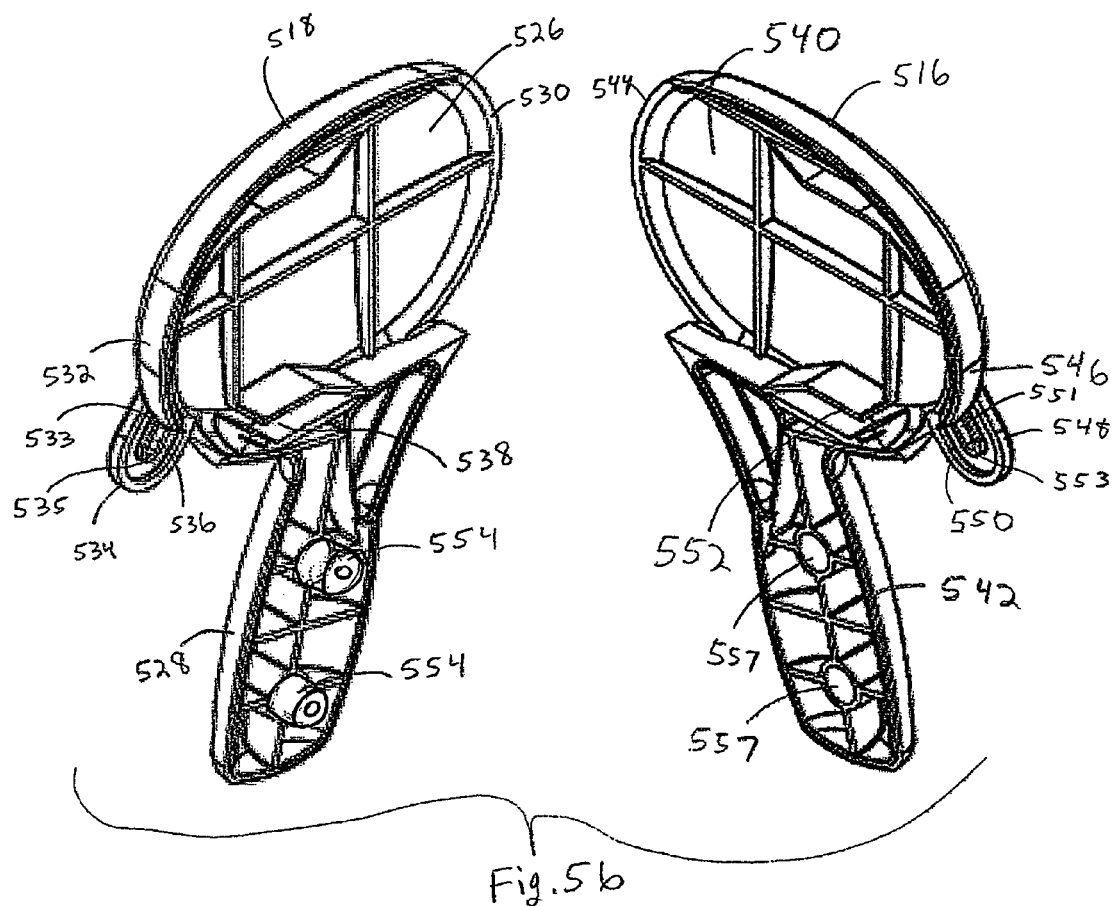
FIG. 56 is a perspective view of the housing body halves of the housing assembly of FIG. 54.

As shown in FIG. 56, housing body halves 516 and 518 are generally symmetrical. Housing body half 518 includes an upper body portion 526 and lower handle portion 528 extending from upper body portion 526. Upper body portion 526 includes a front portion 530 and a rear portion 532. Extending from rear portion 532 is a mounting support 534 that includes an elongated slot 536 for receiving one end 537 of pin 522 (shown in FIG. 54) and mounting the pin to body half 518. Slot 536 includes a front end 533 and a rear end 535, and pin end 537 is movable with the slot between the front end and the rear end. The upper body portion 526 also includes a spring mounting support 538 for mounting leaf spring 524 (shown in FIG. 54) to housing assembly 502. Similarly, housing body half 516 includes an upper body portion 540 and a lower handle portion 542 extending from upper body portion 540. Upper body portion 540 includes a front portion 544 and a rear portion 546. A mounting support 548 extends from rear portion 546. Mounting support 548 includes an elongated slot 550 for receiving the other end 539 of pin 522 (shown in FIG. 54) and mounting the pin to body half 516. Slot 550 includes a front end 551 and a rear end 553, and pin end 539 is movable between the front end and the rear ends. Upper body portion 540 can also include a leaf spring mounting support 552 for mounting leaf spring 524 (shown in FIG. 54) to housing assembly 502.

Housing body halves 516 and 518 can be joined to each other by any suitable methods, including but not limited to ultrasonic welding. In the illustrated embodiment, handle portion 528 of body housing half 518 includes projections 554 that are received into recesses 557 of handle portion 542 of body half 516 when the body halves are joined together. The mating of projections 554 and recesses 557 provides structural strength and stability to the handle 514 and housing assembly 502.

When housing body halves 516 and 518 are joined together, the upper body portions 526 and 540, respectively, define cavity 506 of housing assembly 502, and handle portions 528 and 542 join together to define handle 514 of housing assembly 502. Additionally, the track wheel 520 is rotatably mounted to housing assembly 502 by pin 522, as will be explained in more detail below.

Figures 57, 58, 59:
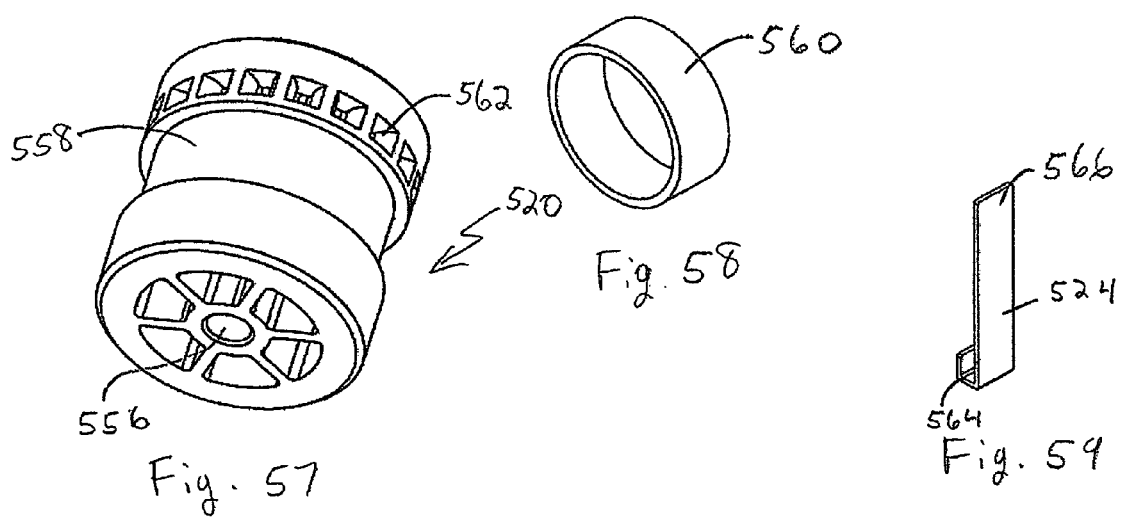
FIG. 57 is a perspective view of the track wheel of the housing assembly of FIG. 54.
FIG. 58 is a perspective view of the gripping section of the track wheel of FIG. 54.
FIG. 59 is a perspective view of the leaf spring of the housing assembly of FIG. 54.

Referring to FIG. 57, track wheel 520 is generally cylindrically shaped and has a central passageway 556 extending therethrough. Track wheel 520 also can include a channel 558 extending circumferentially around the track wheel. Channel 558 is configured to accept a grip ring 560, shown in FIG. 58. If employed, grip ring 560 provides a gripping surface that assists in gripping track wheel 520 with a finger, such a thumb, to rotate the track wheel 520 during use. Preferably, grip ring 560 can be comprised of any suitable polymer that provides a gripping surface for a finger. Furthermore, the polymer ring 560 can be placed around track wheel 520 by any suitable means, such as overmolding. Track wheel 520 also includes a plurality of gear teeth 562, which can be a plurality of recess that are configured to mesh and cooperate with a sprocket of the cartridge assembly 504, as explained in greater detail below.

Figure 55:
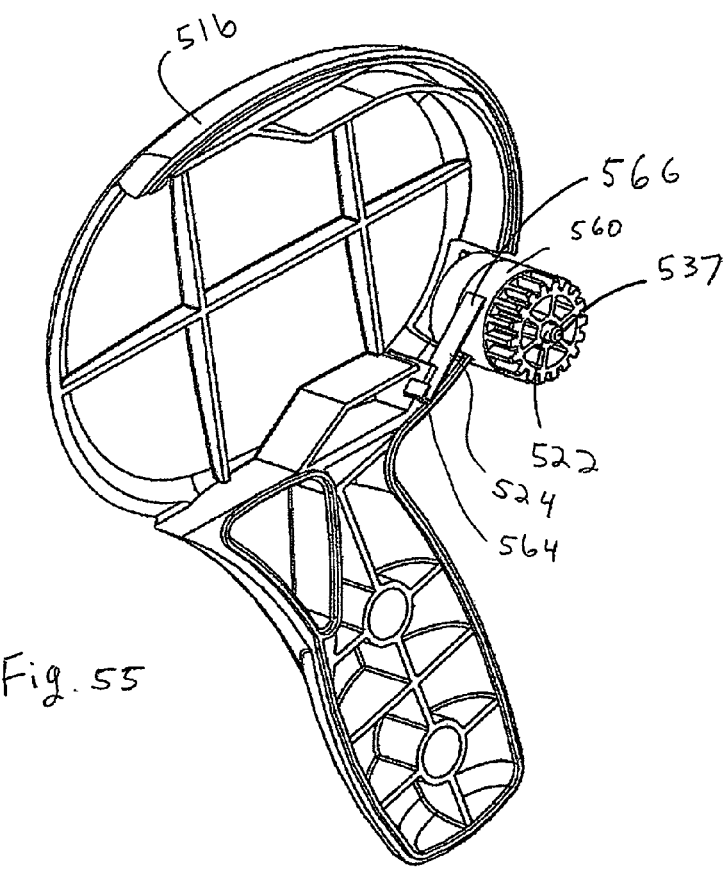
FIG. 55 is a perspective view of the housing assembly of FIG. 54 having one half of the body of the housing assembly removed to show the internal components.

Referring to FIGS. 54 and 55, to rotatably secure the track wheel 520 to housing assembly 502, pin 522 is placed into and extends through passageway 556 of the track wheel 520. The ends 537 and 539 of pin 522 are received into the elongated slots 550 and 536 of opposing supports 548 and 534 of the housing body halves 516 and 518, respectively. Supports 534 and 548 hold pin 522 and track wheel 520 in position, and the track wheel is rotatable about pin 522. A portion of track wheel 520 is exposed so that the track wheel can be easily rotated by a user's finger.

Referring to FIG. 55, leaf spring 524, which is shown in more detail in FIG. 59, includes a mounting end 564 and a free end 566. In this embodiment, mounting end 564 is generally J-shaped and is mounted to either mounting support 538 of body half 518, mounting support 552 of body half 516 or both. Free end 566 contacts and biases track wheel 520 rearwardly so that the pin ends 537 and 539 are positioned at the rear ends 535 and 553 of elongated slots 536 and 550 (shown in FIG. 56), respectively, and the track wheel 520 is in a rearward or disengaged position. As will be explained in more detail below, is this position, the track wheel 520 is disengaged from gears of the cartridge assembly 504. During use, a user can move the track wheel into an engaged position, i.e., the gear teeth 562 of the track wheel 520 are engaged with gears of the cartridge assembly 504, by applying pressure to the track wheel 520. Upon application of pressure, the leaf spring 524 will flex, and the pin ends 537 and 539 will move toward the front ends 533 and 551 of elongated slots 536 and 550, respectively. As the pin 524 moves forwardly within slots 536 and 550, the track wheel 520 also moves forward to engage the gears of the cartridge assembly 504, as will be explained in more detail below.

Referring to back to FIG. 52, cartridge assembly 504 includes a cartridge body 568, which may be provided as a unitary structure or as a pair of symmetrical body halves. The components of cartridge assembly 504 are shown in more detail in FIGS. 60 and 61. A number of rotatable components, namely, roller 570, primary spool 572 and secondary spool 574 are mounted onto cartridge body 568. In the embodiment illustrated in FIG. 61, the cartridge body includes a first body half 578 and a second body half 580, which can be joined together by an suitable means.

Roller 570 is generally similar to the roller previously described, and is rotatably mounted to roller support member 582 of body half 578, as shown in FIG. 60. The primary spool 572 is comprised of a disk-shaped wheel portion 584 and a hub portion 586 extending away from the wheel portion 584. A passageway 588 extends through the center of the hub portion 586 and the primary spool 572 is rotatable mounted to the cartridge body 568 by inserting a primary spool support 590 of housing body half 578 through passageway 588, as shown in FIG. 60. The hub portion 586 is adapted to receive a roll of adhesive material. The roll can be fixed to the hub portion by fiction fit, a key or adhesive, so that the roll rotates with the primary spool. A plurality of gear teeth 592 extend around the outer circumference of the wheel portion 584. As explained in greater detail below, gear teeth 592 are configured to mesh and cooperate with the teeth of the secondary gear of the secondary spool 574.

Figure 63:
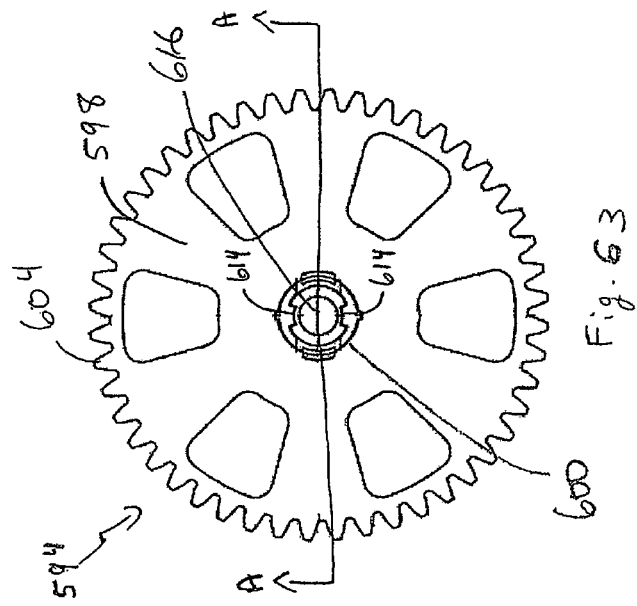
FIG. 63 is an elevational view of the disk-like portion of the secondary spool of the cartridge assembly of FIG. 61.
Figure 65:
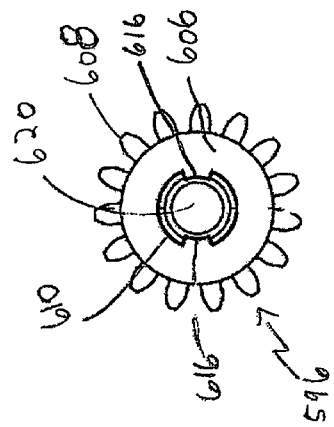
FIG. 65 is a plan view of the second portion of the secondary spool of the cartridge assembly of FIG. 61.
Figure 64:
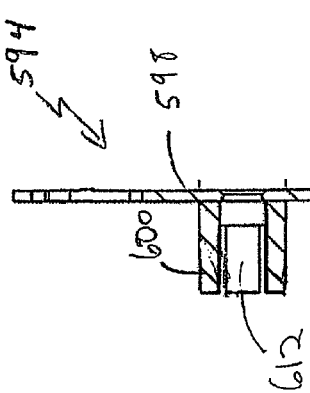
FIG. 64 is a cross-sectional view of the secondary spool of FIG. 63 taken along lines A-A.

The secondary spool 574, which is shown in FIG. 61 and in more detail in FIGS. 63, 64 and 65, includes a first portion 594 and a second portion 596 (as shown in FIG. 61). The first portion 594 includes a disk-shaped sprocket portion 598 and tubular hub portion 600 extending away from the sprocket portion 598, as shown in FIGS. 63 and 64. Similar to the previous embodiments, the hub portion 600 is adapted to receive slip sleeve 602 (shown in FIG. 61), which generally serves the same rotational speed differential function as described above. The outer circumference of the sprocket portion 598 includes a plurality of gear teeth 604 adapted to cooperate with the gear teeth 562 of the track wheel 520 when the cartridge assembly 502 is mounted to the housing assembly 502 and the track wheel 520 is in the engaged position. The second portion 596 of the secondary spool 574 includes a secondary sprocket portion 606 including a plurality of gear teeth 608 and a shaft portion 610 extending form the secondary sprocket portion 606, as shown in FIGS. 61 and 64. The first and second portions 594 and 596 of the secondary spool 574 are joined together by inserting the shaft portion 610 of the second portion 596 into a passageway 612 extending through the hub portion 600 of the first portion 594. The shaft 610 engages the hub portion 600 so that the first and second portions 594 and 596 of the secondary spool 574 are fixed to one another and rotate in unison. In the illustrated embodiment, the passageway 612 of the hub portion 600 has a pair of opposed projections 614 (as shown in FIG. 63) extending into the passageway 612 and the shaft portion 610 of second portion 596 includes a pair of opposed notches 616 that are configured to accept and frictionally engage the projections 614. Accordingly, the engagement between the notches 616 and the projections 614 results in the first and second portions 594 and 596 rotating together. The secondary gear teeth 608 of secondary sprocket portion 606 of the second portion 596 are configured to mesh and cooperate with the gear teeth 592 of the primary spool 572, so that the secondary spool 574 rotates with and in the opposite direction of the primary spool 572 and vice versa.

Figure 62:
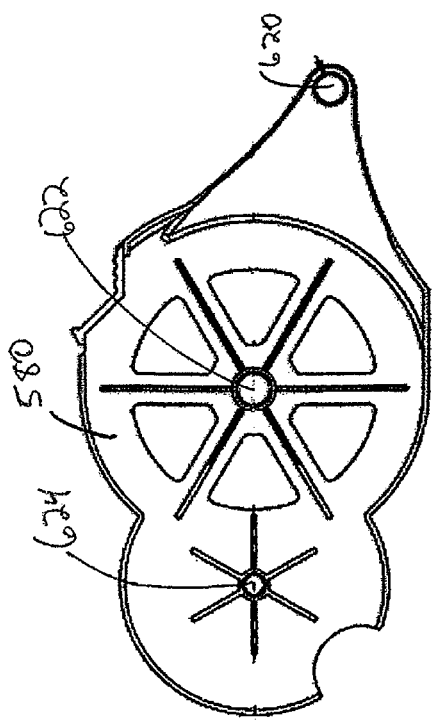
FIG. 62 is an elevational view of one of the body halves of the cartridge assembly of FIG. 61.

The secondary spool 574 is rotatably mounted to body half 578 by inserting secondary spool support member 618 through a passageway 620 in the second portion 596 of the secondary spool 574 and through the passageway 616 of the hub portion 600 of the first portion 594. When components of the cartridge assembly are mounted on there respective support members 582, 590 and 618 and housing body halves 578 and 580 are joined together, the support members 582, 590 and 618 of body half 578 engage openings 620, 622 and 624 (best shown in FIGS. 61 and 62) of the body half 580. This engagement secures the components on the respective support members and assists in supporting the support members.

Figure 66:
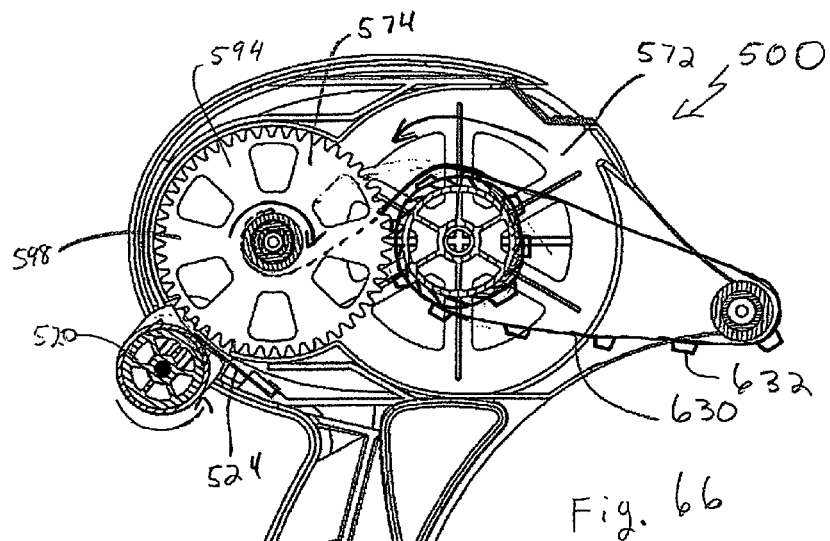
FIGS. 66 and 67 are schematic illustrations of the drive mechanism of the handheld applicator of FIG. 52.
Figure 67:
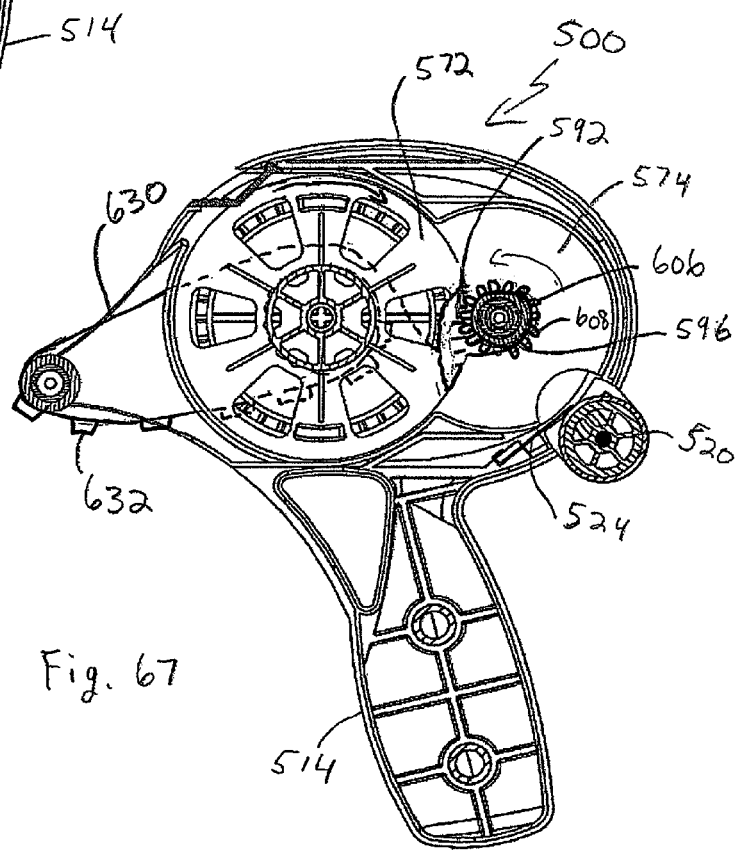

Referring to FIGS. 66 and 67, handheld application 500 can be used for either glide-type applications or single adhesive segment applications. The glide-type application is similar to the glide type application described above. In such application, the use grips handle portion 514, presses the linear or carrier strip 630 against and object (not shown) and moves the handheld applicator 500 downwardly or in the direction of adhesive application. As the handheld applicator 500 is moved, the friction between the carrier tape 630 and the object causes the primary spool 572 to rotate in a counter-clockwise direction in FIG. 66 and a clockwise direction in FIG. 67. Referring to FIG. 67, the cooperation of the gear teeth 592 of the primary spool 572 and the gear teeth 608 of secondary sprocket portion 606 of the second portion 596 of the secondary spool 574 cause the secondary spool 574 to rotate in the opposite direction and spent carrier tape 630 is automatically taken up by the secondary spool 574. The glide motion continues until a desired number of adhesive segments 632 is transferred to the object, Additionally, because the leaf spring 524 is biasing the track wheel 520 to a disengaged position, and thus the track wheel 520 is disengaged from the secondary spool 574, the primary and secondary spools 572 and 574 are free to rotate without interference from the track wheel 520. With the track wheel 520 disengaged, less force is required to rotate the primary and secondary spools.

According to one method of using the handle held applicator 500, a selected amount of adhesive 632 can be positioned for application to an object by manually advancing the carrier strip or liner 630 a desired amount. Referring to FIG. 66, in this embodiment, the track wheel 520 is being held in a disengaged position by the leaf spring 524 and a user applies enough force to the track wheel 520 to flex the leaf spring 524 and move the track wheel 520 forwardly into the engaged position (not shown). In the engaged position, the gears 562 (not shown) of track wheel 520 engage the sprocket portion 598 of the first portion 594 of secondary spool 574. With reference to FIG. 66, rotation of the track wheel 520 in a counter-clockwise direction drives the secondary spool 574 in a clockwise direction. Turing to FIG. 67, because of the cooperation between the secondary sprocket portion 606 of the secondary spool 574 and the gear teeth 592 of the primary spool 572, the primary spool 572 rotates in a direction opposite the secondary spool 574. As the primary spool 572 rotates, it advances or pays out a length of carrier tape 630. The user rotates the track wheel 520 until a desired amount of carrier tape 630 is advanced from the primary spool 572. Preferably, the user rotates the track wheel 520 to advance enough tape 630 to place one adhesive segment 632 into position for attachment to an object. It should be under stood that slack in the carrier tape 630 between the primary or supply spool 572 and the secondary or take-up spool 574 can be removed by rotating the track wheel 520 in the opposite direction.

It will be understood that the embodiments of the present invention which have been described are illustrative of some of the applications of the principles of the present invention. Numerous modifications may be made by those skilled in the art without departing from the true spirit and scope of the invention, including those combinations of features that are individually disclosed or claimed herein.

The invention claimed is:

1. An adhesive applicator, comprising:
   a housing;
   a primary spool mounted to the housing, the primary spool adapted to receive an adhesive roll including a wound supply of liner carrying an adhesive;
   a secondary spool mounted to the housing, the secondary spool adapted to collect portions of the liner advanced from the adhesive roll; and
   a circular rotatable advancement member for advancing indefinite amounts of liner from the adhesive roll, the rotatable advancement member mounted on the housing in a position that is non-axial with the primary and secondary spools and the rotatable advancement member partially extending from an opening in the housing such that the rotatable advance member is adapted to be contacted and rotated by a user to advance a desired amount of the liner from the adhesive roll;
   the rotatable advancement member being movable from a disengaged position wherein the advancement member is disengaged from one of the primary spool and the secondary spool to an engaged position wherein the rotatable advancement member is engaged with one of the primary spool and the secondary spool, and wherein the advancement member is biased toward the disengaged position.

2. The adhesive applicator of claim 1 in which the primary spool and secondary spool are mounted to a cartridge removably connected to the housing.

3. The adhesive applicator of claim 1 in which the rotatable advancement member is disengageably associated with with the primary spool.

4. The adhesive applicator of claim 1 in which the rotatable advancement member is disengageably associated with the secondary spool.

5. The adhesive applicator of claim 1 in which rotation of the rotatable advancement member causes the liner to rewind onto the adhesive roll.

6. The adhesive applicator of claim 1 in which the secondary spool includes a rotational speed differential mechanism configured to compensate for a rotational speed differential between the primary and secondary spools.

7. The adhesive applicator of claim 6 in which the rotational speed differential mechanism includes a slip sleeve associated with the secondary spool.

8. An adhesive applicator, comprising:
   a housing;
   a cartridge removably connected to the housing, the cartridge having a primary spool including an adhesive roll having a wound supply of a liner carrying an adhesive and a secondary spool adapted for collecting portions of the liner advanced from the adhesive roll; and
   a circular rotatable track wheel adapted for advancing variable amounts of liner from the adhesive roll, the rotatable track wheel being in a position that is non-axial with the primary and secondary spools, wherein rotation of the track wheel causes a desired amount of the liner to advance from the adhesive roll;
   the track wheel being movable from a disengaged position wherein the track wheel is disengaged from one of the primary spool and the secondary spool to an engaged position wherein the track wheel is engaged with one of the primary spool and the secondary spool, and wherein the track wheel is biased toward the disengaged position.

9. The adhesive applicator of claim 8 in which the track wheel is disengageably associated with the primary spool.

10. The adhesive applicator of claim 8 in which the track wheel is disengageably associated with the secondary spool.

11. The adhesive applicator of claim 8 in which the track wheel is rotatably mounted on the housing.

12. The adhesive applicator of claim 8 in which rotation of the track wheel causes the liner to rewind onto the adhesive roll.

13. The adhesive applicator of claim 8 in which the primary spool includes a first set of gear teeth and the secondary spool includes a second set of gear teeth, wherein the first and second sets of gear teeth mesh so that the primary and secondary spools rotate relative to each other.

14. The adhesive applicator of claim 8 in which the cartridge includes a rotational speed differential mechanism configured to compensate for a rotational speed differential between the primary and secondary spools.

15. The adhesive applicator of claim 14 in which the rotational speed differential mechanism includes a slip sleeve associated with the secondary spool.

16. An adhesive applicator, comprising:
   a rotatable adhesive roll including a wound supply of a liner carrying an adhesive thereon;
   a take-up roll having a portion of the liner connected thereto, the take-up roll adapted for collecting portions of the liner advanced from the adhesive roll; and
   a rotatable advancement member for advancing an indefinite amount of liner from the adhesive roll, the rotatable advancement member being non-axial with the adhesive roll and the take-up roll, and the rotatable advance member being rotatable 360 degrees about an axis of the rotatable advancement member, wherein the rotatable advancement member is adapted to be rotated to advance a desired amount of the liner from the adhesive roll;
   the rotatable advancement member being movable from a disengaged position wherein the advancement member is disengaged from one of the adhesive roll and the take-up roll to an engaged position wherein the rotatable advancement member is engaged with one of the adhesive roll and the take-up roll, and wherein the advancement member is biased toward the disengaged position.

17. The adhesive applicator of claim 16 in which the rotatable advancement member comprises a generally cylindrically shaped wheel.

18. The adhesive applicator of claim 16 in which the rotatable advancement member is configured to cause the liner to rewind onto the adhesive roll.

19. The adhesive applicator of claim 16 further including a rotational speed differential mechanism configured to compensate for a rotational speed differential between the primary and secondary spools.

* * * * *